(12) United States Patent
Sugino

(10) Patent No.: US 11,169,882 B2
(45) Date of Patent: Nov. 9, 2021

(54) IDENTIFICATION OF A SUSPECT COMPONENT CAUSING AN ERROR IN A PATH CONFIGURATION FROM A PROCESSOR TO IO DEVICES

(71) Applicant: FUJITSU LIMITED, Kawasaki (JP)

(72) Inventor: Masatoshi Sugino, Chiba (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 16/453,292

(22) Filed: Jun. 26, 2019

(65) Prior Publication Data

US 2020/0012565 A1  Jan. 9, 2020

(30) Foreign Application Priority Data

Jul. 6, 2018 (JP) .............................. JP2018-129172

(51) Int. Cl.
| | | |
|---|---|---|
| *G06F 11/00* | (2006.01) | |
| *G06F 11/14* | (2006.01) | |
| *G06F 13/40* | (2006.01) | |
| *G06F 9/4401* | (2018.01) | |
| *G06F 11/07* | (2006.01) | |
| *G06F 11/22* | (2006.01) | |

(52) U.S. Cl.
CPC ........ *G06F 11/1423* (2013.01); *G06F 9/4411* (2013.01); *G06F 11/0784* (2013.01); *G06F 11/2284* (2013.01); *G06F 13/4022* (2013.01)

(58) Field of Classification Search
CPC ............... G06F 11/0709; G06F 11/221; G06F 11/1423; G06F 11/0784; G06F 11/2284; G06F 11/079; G06F 11/2007; G06F 11/0772; G06F 11/1417; G06F 11/2005; G06F 13/4022; G06F 9/4411

USPC ....................................................... 714/1–57
See application file for complete search history.

(56) References Cited

U.S. PATENT DOCUMENTS

| | | | | |
|---|---|---|---|---|
| 5,392,328 A | * | 2/1995 | Schmidt ................... | H04Q 1/24 370/244 |
| 6,032,265 A | | 2/2000 | Oguro et al. | |
| 2006/0095815 A1 | * | 5/2006 | Noy ........................ | H04L 45/26 714/712 |
| 2006/0233204 A1 | | 10/2006 | Pomaranski et al. | |

(Continued)

FOREIGN PATENT DOCUMENTS

| | | |
|---|---|---|
| JP | 9-34809 | 2/1997 |
| JP | 2000-148655 | 5/2000 |
| JP | 2006-302287 | 11/2006 |

*Primary Examiner* — Sarai E Butler
(74) *Attorney, Agent, or Firm* — Staas & Halsey, LLP

(57) ABSTRACT

An apparatus stores path configuration information specifying a first path configuration and a second path information each of which indicates a target path configuration from a target processor to IO devices. When an error is detected from among the IO devices in a state where the target path configuration is the first path configuration, the apparatus changes the first path configuration to the second path configuration. When an error is detected from among the IO devices under the second path configuration, the apparatus identifies a suspect component included in the target path configuration, based on a comparison result of comparison between a first IO device whose error has been detected under the first path configuration, and a second IO device whose error has been detected under the second path configuration.

12 Claims, 25 Drawing Sheets

(56) References Cited

U.S. PATENT DOCUMENTS

| | | | |
|---|---|---|---|
| 2007/0180287 A1* | 8/2007 | Kumar | G06F 11/0709 |
| | | | 714/4.11 |
| 2012/0137166 A1* | 5/2012 | Kurihara | G06F 11/2005 |
| | | | 714/5.1 |
| 2015/0309892 A1* | 10/2015 | Ramasubramaniam | ............ |
| | | | G06F 11/2092 |
| | | | 714/4.5 |
| 2017/0054630 A1* | 2/2017 | Liang | H04L 45/64 |
| 2018/0295015 A1* | 10/2018 | Fritz | H04L 45/28 |

* cited by examiner

FIG. 7A

| Condition |
|---|
| en |

| ENTRY NUMBER | Mode | TARGET SWITCH NUMBER | BUS# LIST (HIGHER LEVEL primary, secondary-subordinate) | PORT ACTIVATION STATUS LIST (SW-ID, port-ID, on/off) |
|---|---|---|---|---|
| 1 | 1 (NORMAL) | 0xFF | (11,12-15), (17,18-21) | (1,1,1), (1,2,0), (2,1,1), (2,2,0) |
| 2 | 2 (SUBSTITUTE) | 1 | (17,18-21), (11,12-15) | (1,1,0), (1,2,1), (2,1,0), (2,2,1) |
| 3 | 2 (SUBSTITUTE) | 2 | (17,18-21), (11,12-15) | (1,1,0), (1,2,1), (2,1,0), (2,2,1) |
| .. | | | | |
| 5 | 3 (DEGENERATE) | 1 | (0xFF, 0xFF-0xFF), (11, 12-21) | (1,1,0), (1,2,0), (2,1,1), (2,2,1) |
| 6 | 3 (DEGENERATE) | 2 | (11, 12-21), (0xFF, 0xFF-0xFF) | (1,1,1), (1,2,1), (2,1,0), (2,2,0) |
| .. | | | | |
| N | 0xFF | | | |

FIG. 7B

| BUS# | DEV# |
|---|---|
| 14 | 0 |

FIG. 7C

| SWITCH NUMBER | primary | port1 | port2 | port3 |
|---|---|---|---|---|
| 1 | 12 | 13.0 | 14.0 | 15.0 |
| 2 | 18 | 19.0 | 20.0 | 21.0 |
| | 0xFF | | | |

FIG. 7D

IDENTIFICATION OF A SUSPECT COMPONENT CAUSING AN ERROR IN A PATH CONFIGURATION FROM A PROCESSOR TO IO DEVICES

CROSS-REFERENCE TO RELATED APPLICATION

This application is based upon and claims the benefit of priority of the prior Japanese Patent Application No. 2018-129172, filed on Jul. 6, 2018, the entire contents of which are incorporated herein by reference.

FIELD

The embodiments discussed herein are related to identification of a suspect component causing an error in a path configuration from a processor to IO devices.

BACKGROUND

When an unrecoverable error occurs in an input and output (input/output: IO) device during an operation of an information processing apparatus (computer), error information is recorded to the input and output device. Then, the information processing apparatus recognizes the occurrence of the error when the error information is transmitted from the input and output device to a central processing unit (CPU).

After the occurrence of the error is recognized, the error information on all components including the transmission path is checked and narrowed down to an error occurrence site, and the faulty component thus identified is replaced with a normal component. Hereinafter, the input and output device is also referred to as an IO device.

Before the information processing apparatus starts to operate, a basic input/output system (BIOS) performs a power-on self-test (POST) in common practice. The POST includes various kinds of initialization processing executed to enable the information processing apparatus to operate and includes processing to detect IO devices mounted on the information processing apparatus by searching the IO bus, and initialize the IO devices.

FIG. 1 illustrates a configuration example of a small-scale information processing apparatus in which IO devices are directly coupled to IO interfaces of a CPU. An information processing apparatus 101 in FIG. 1 includes a CPU 111, IO devices 112-1 to 112-3, and a memory 114. The IO devices 112-1 to 112-3 are coupled to IO interfaces 113-1 to 113-3, respectively. The information processing apparatus 101 operates as follows.

Step 1: The CPU 111 starts up the BIOS upon power-on, and the BIOS executes the POST.

Step 2: The BIOS searches for devices mounted and detects the IO devices 112-1 to 112-3 during the execution of the POST.

Step 3: The BIOS loads drivers of the detected IO devices 112-1 to 112-3, and executes initialization processing on the drivers.

For error handling, there have been known computer systems including redundant IO interfaces, computer systems including a double system bus adapter, and information processing systems including redundant information transfer paths (see, for example, Japanese Laid-open Patent Publication Nos. 2006-302287, 9-34809, and 2000-148655).

SUMMARY

According to an aspect of the embodiments, an apparatus stores path configuration information specifying a first path configuration and a second path configuration each of which indicates a target path configuration from a target processor to a plurality of input and output devices. When an error is detected from among the plurality of input and output devices in a state where the target path configuration is the first path configuration, the apparatus changes the first path configuration to the second path configuration. When an error is detected from among the plurality of input and output devices under the second path configuration, the apparatus identifies a suspect component included in the target path configuration, based on a comparison result of comparison between a first input and output device whose error has been detected under the first path configuration, and a second input and output device whose error has been detected under the second path configuration.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A to 7D are diagrams illustrating information stored by the management apparatus;

DESCRIPTION OF EMBODIMENTS

In some large-scale information processing apparatuses, multiple components are present on a path from the CPU to each IO device. For this reason, in the case where an error occurs in an access from the CPU to an IO device, it is difficult to isolate the cause by determining which one of the IO device and the other components on the path is a faulty component.

Note that this problem occurs not only in an information processing apparatus including multiple components on the path from a CPU to an IO device, but also in an information processing apparatus including multiple components on a path from another processor to an IO device.

It is preferable to identify a suspect component included in a path configuration from a processor to a plurality of input and output devices when an error is detected from among the plurality of input and output devices.

Hereinafter, embodiments are described in detail with reference to the drawings.

Figure 2:
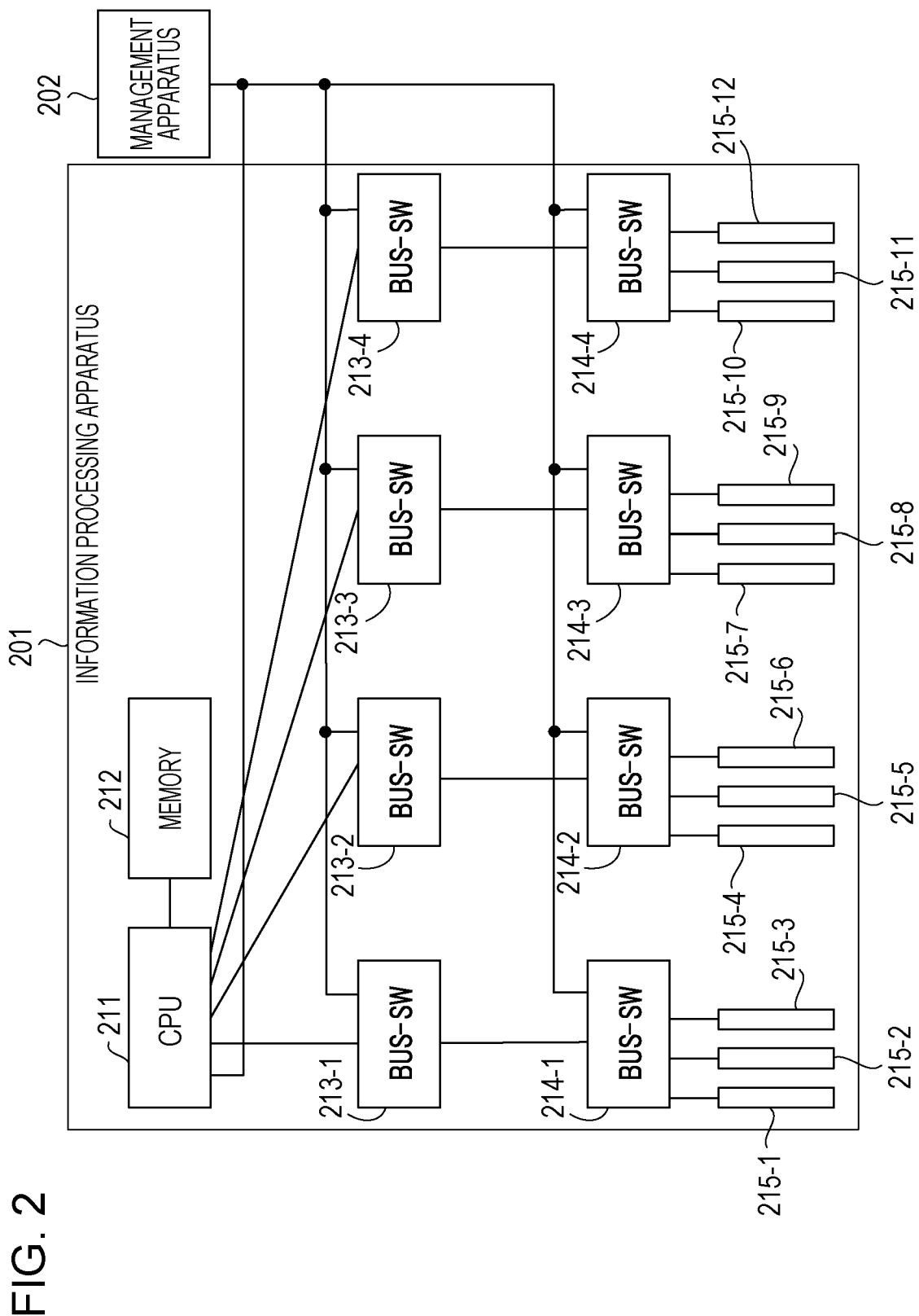
FIG. 2 is a configuration diagram of a large-scale information processing apparatus.

FIG. 2 illustrates a configuration example of a large-scale information processing apparatus in which IO devices are coupled to IO interfaces of a CPU through bus switches (BUS-SWs). An information processing apparatus 201 in FIG. 2 includes a CPU 211, a memory 212, BUS-SWs 213-1 to 213-4, BUS-SWs 214-1 to 214-4, and IO devices 215-1 to 215-12. The memory 212 stores programs to be executed by the CPU 211 and data including configuration information of the information processing apparatus 201.

The BUS-SWs 213-1 to 213-4 are higher-level bus switches and are coupled to the CPU 211. The BUS-SWs 214-1 to 214-4 are lower-level bus switches and the BUS-SW 214-i (i=1 to 4) is coupled to the BUS-SW 213-i.

The IO devices 215-1 to 215-3 are coupled to the BUS-SW 214-1 and the IO devices 215-4 to 215-6 are coupled to the BUS-SW 214-2. The IO devices 215-7 to 215-9 are coupled to the BUS-SW 214-3 and the IO devices 215-10 to 215-12 are coupled to the BUS-SW 214-4.

In this case, the BUS-SW 213-i and the BUS-SW 214-i are present on the path from the CPU 211 to each IO device 215-j (j=1 to 12).

A management apparatus 202 is an information processing apparatus that manages the information processing apparatus 201, and is capable of communicating with the CPU 211, the BUS-SWs 213-1 to 213-4, and the BUS-SWs 214-1 to 214-4. The management apparatus 202 is also referred to as a management blade (MMB). The information processing apparatus 201 operates as follows.

Step 1: The CPU 211 starts up the BIOS upon power-on, and the BIOS executes the POST.

Step 2: During the execution of the POST, the BIOS initializes the BUS-SW 213-i and the BUS-SW 214-i on each path based on the configuration information of the information processing apparatus 201.

Step 3: During the execution of the POST, the BIOS searches for mounted devices and detects the IO devices 215-1 to 215-12.

Step 4: The BIOS loads only a driver of the IO device to be used as a resource to start up the operating system (OS) among the detected IO devices and performs initialization processing on the driver.

In the large-scale information processing apparatus, it is often the case that only the driver of the IO device involved in OS booting is loaded during the execution of the POST as in step 4 and the drivers of the other IO devices are loaded during startup of the OS. This intends not to exhaust the legacy-IO space allocated during the initialization, and achieves shortening of the time required for the initialization processing.

If the occurrence of an error is detected in any of the BUS-SWs at step 2, the error information is transmitted to the management apparatus 202, the management apparatus 202 notifies a used of the error, and the information processing apparatus 201 fails the initialization and halts. In addition, the drivers of all the detected IO devices are not loaded at step 4, but the initialization of the IO devices is left to the driver on the OS. For this reason, the loading operation and the initialization processing for the drivers during the execution of the POST may be skipped in some cases.

In the case where a certain BUS-SW on a path has a failure, however, there is a possibility of failing to clearly isolate the cause by determining which one of the IO device and the BUS-SWs is a faulty component because the certain BUS-SW is not directly accessed while the information processing apparatus is operating.

For example, in the case where a peripheral component interconnect (PCI)-express is used as an IO bus, a faulty site causing an error is identified depending on a type of the error reported according to the definition in the specification document of the PCI-express interface. If the type of the error indicates an IO device itself, it is possible to determine that the IO device is a faulty component. However, if the type of the error indicates an error on a path, the IO device being accessed at the time of detection of the error may not be a faulty component causing the error.

Specifically, when an unrecoverable error is recognized during the operation, the OS invokes a state such as a forced outage like PANIC or Blue Screen of Death (BSOD), and shuts the system down. Then, the BIOS eventually tries to make a recovery by restating the OS.

If the system is down due to the error of the IO device itself, the error of the IO device itself is recognized and accordingly the IO device may be disconnected as the faulty component. However, an error detection is possible only for a component whose error information is received. For this reason, if the system is down due to an error on the path, it is difficult to isolate the problem to any one of the sending end and the receiving end of the error information. Hence, only the IO device being accessed at the time of detection of the error is reported.

In addition, as defined in the specification document, the general BUS-SW only transfers the received error information to the highest-level side of the interface, and the BUS-SW itself does not perform error processing. In other words, there may be a case where an error of an IO device is reported to the component at the highest level of the interface even though a component on the path actually has a failure. In this case, even if the IO device reported is disconnected, the faulty component on the path remains and may make the system down again. If the IO device including the path is disconnected for the sake of safety, the entire configuration of the information processing apparatus is greatly affected, which may make it difficult to restart the information processing apparatus with the same settings.

Figure 3A:
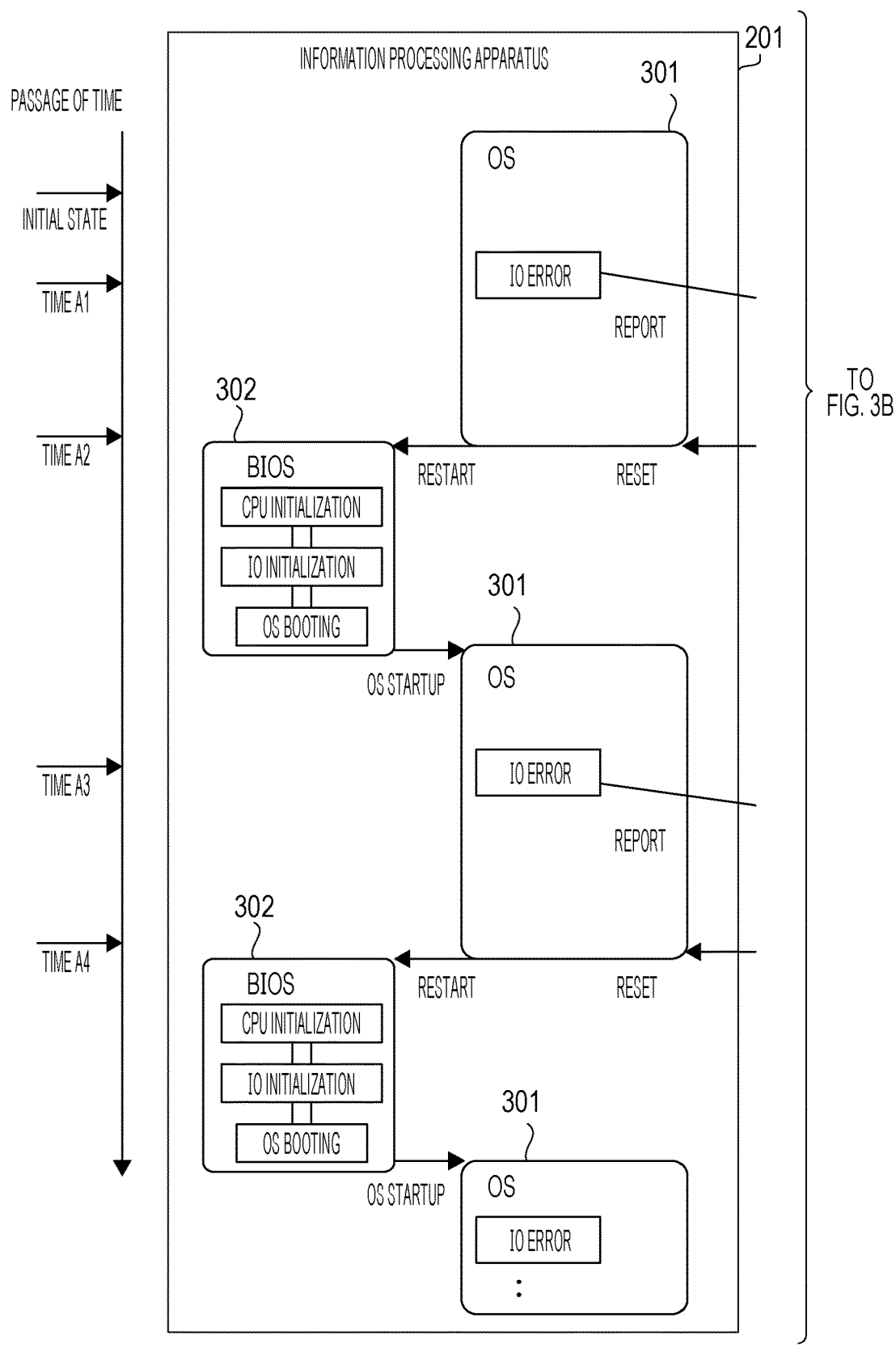
FIGS. 3A and 3B are diagrams illustrating an operation sequence for a case where errors occur again and again.
Figure 3B:
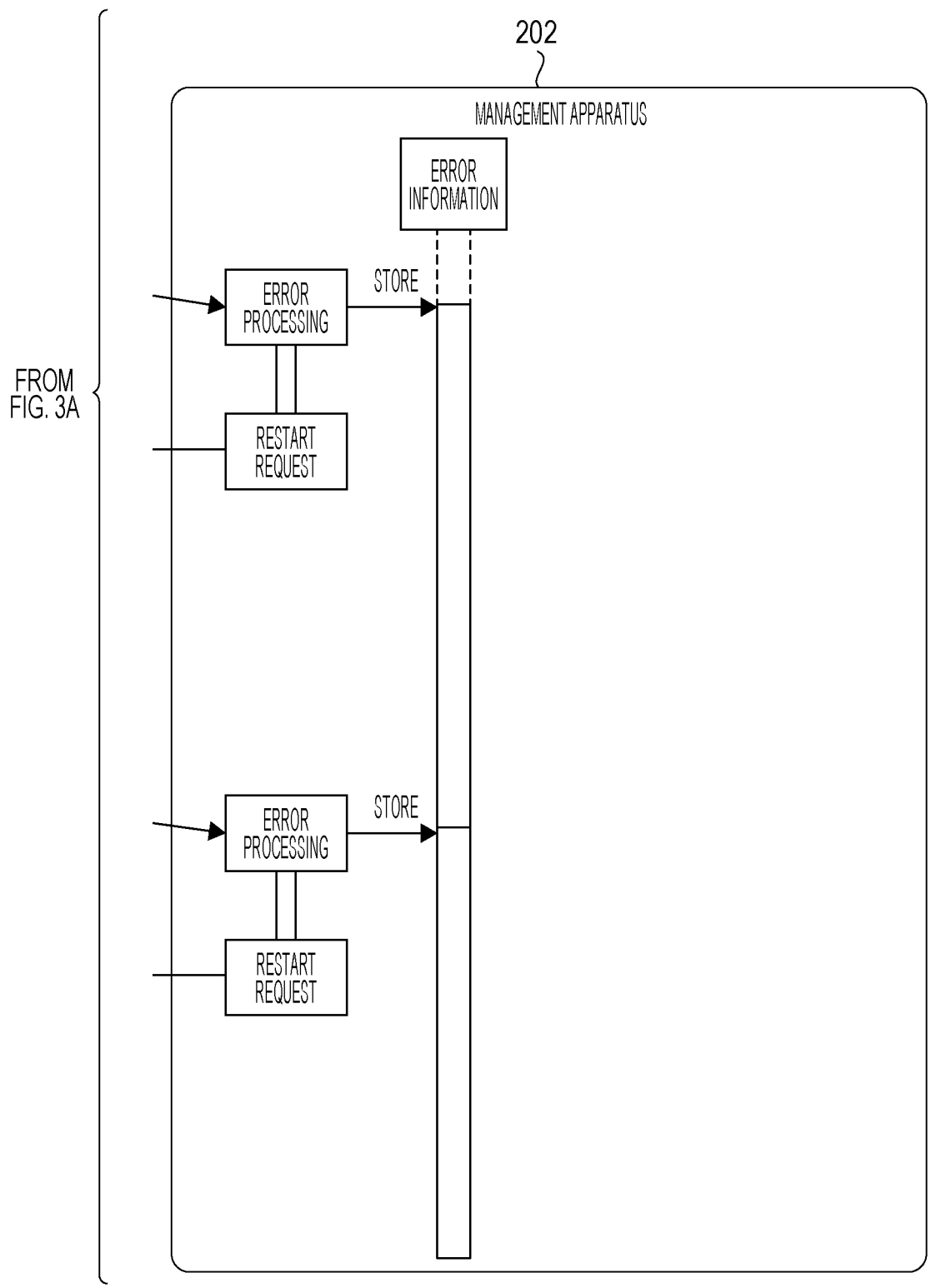

FIGS. 3A and 3B are diagrams illustrating an operation sequence for a case where an error occurs again and again in the information processing apparatus 201 in FIG. 2. First, at time A1, an OS 301 detects, as an IO error, an error in an access to the IO device 215-1, and reports the first IO error to the management apparatus 202. In this case, suspect components as candidates for a faulty component are the BUS-SW 213-1, the BUS-SW 214-1, and the IO device 215-1 included in a path from the CPU 211 to the IO device 215-1, and therefore a single definite suspect component is not identified.

Then, the management apparatus 202 performs error processing to store the error information of the IO device 215-1 and resets the OS 301 by sending a restart request to the OS 301 at time A2. The OS 301 restarts the information processing apparatus 201 in response to the restart request. In the process of restarting, the control is passed to a BIOS 302, and the BIOS 302 initializes the CPU, initializes the IO devices, and starts up the OS 301 by OS booting.

Next, at time A3, the OS 301 detects a second IO error of the IO device 215-1, and reports the IO error to the management apparatus 202. Also in this case, a single definite suspect component is not identified. Thus, the management apparatus 202 stores the same error information as the first error information, and resets the OS 301 at time A4. The OS 301 restarts the information processing apparatus 201, and the BIOS 302 initializes the CPU, initializes the IO devices, and starts up the OS 301 by OS booting. Then, the OS 301 detects a third IO error.

In the case where the system is down due to the error on the path, the OS 301 detects the IO error again and again and the failure appears to repetitively occur, because the management apparatus 202 does not identify or disconnect the faulty component as described above.

Moreover, the information processing apparatus 201 including the IO device, the error of which is detected, is initialized during the restart operation. However, in the case where the system is down due to an intermittent failure, the error may not be detected in the initialization processing. In addition, also in the case where the diagnosis processing by the driver on the OS 301 is simplified, the error may not be detected in the initialization processing.

When the error information is stored, the suspect component may be replaced later. However, in the case where the error information of the faulty component on the path is not present, the narrowing down to a single suspect component is very difficult. In the case where multiple logs of the error information are recorded, the narrowing down to a single suspect component is also very difficult because the transmission order of the logs of the error information is not recorded.

Figure 4:
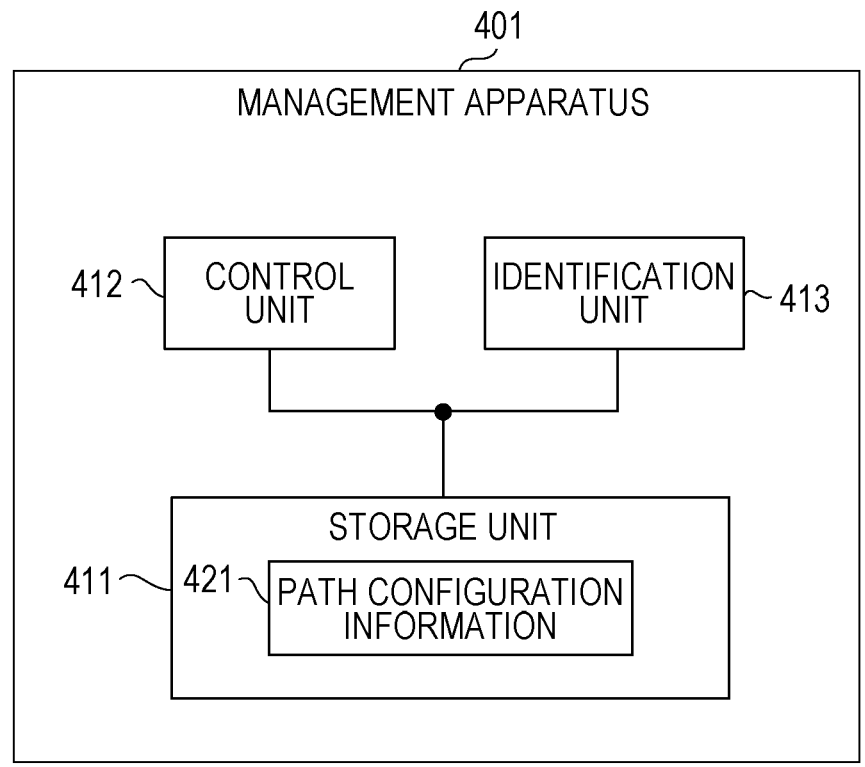
FIG. 4 is a functional configuration diagram of a management apparatus.

FIG. 4 illustrates a functional configuration example of a management apparatus of an embodiment. A management apparatus 401 in FIG. 4 includes a storage unit 411, a control unit 412, and an identification unit 413. The storage unit 411 stores path configuration information 421 specifying a first path configuration from a processor to multiple input and output devices, and a second path configuration from the processor to the multiple input and output devices. The control unit 412 and the identification unit 413 execute suspect component identifying processing of identifying a suspect component by using the path configuration information 421.

Figure 5:
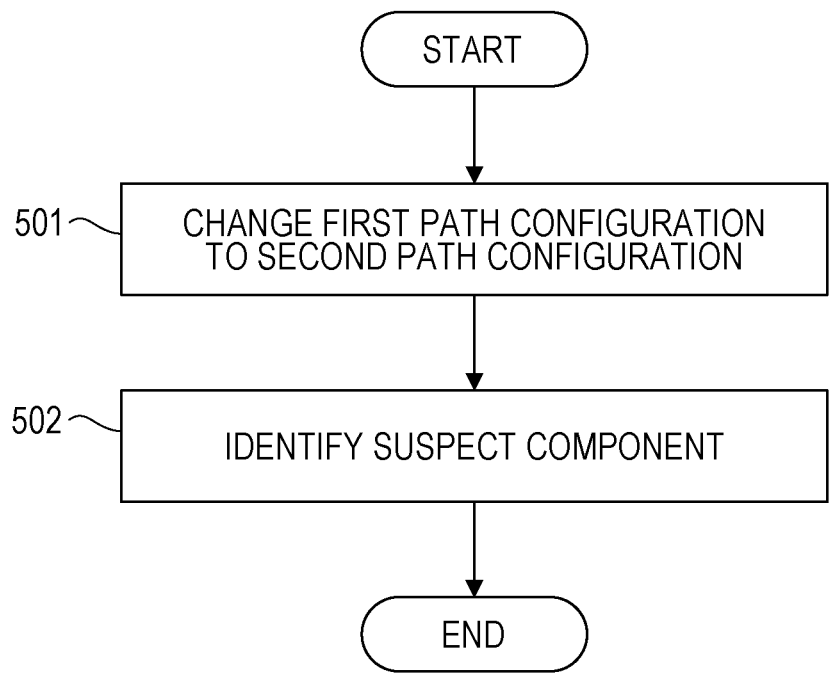
FIG. 5 is a flowchart of suspect component identifying processing.

FIG. 5 is a flowchart illustrating an example of the suspect component identifying processing to be executed by the management apparatus 401 in FIG. 4. First, in the case where the path configuration from the processor to the multiple input and output devices is the first path configuration and an error of any of the input and output devices is detected, the control unit 412 changes the first path configuration to the second path configuration (step 501).

If an error of any of the input and output devices is detected under the second path configuration after the change, the identification unit 413 identifies a suspect component included in the path configuration from the processor to the multiple input and output devices (step 502). In this case, the identification unit 413 identifies the suspect component based on a comparison result of comparison between the input and output device, the error of which is detected under the first path configuration, and the input and output device, the error of which is detected under the second path configuration.

In the case where an error of an input and output device is detected in the information processing apparatus, the management apparatus 401 in FIG. 4 is capable of narrowing down the suspect components in the paths from the processor to the input and output device concerned. For example, a CPU, a microprocessor, a digital signal processor, or the like may be used as the above processor.

Figure 6:
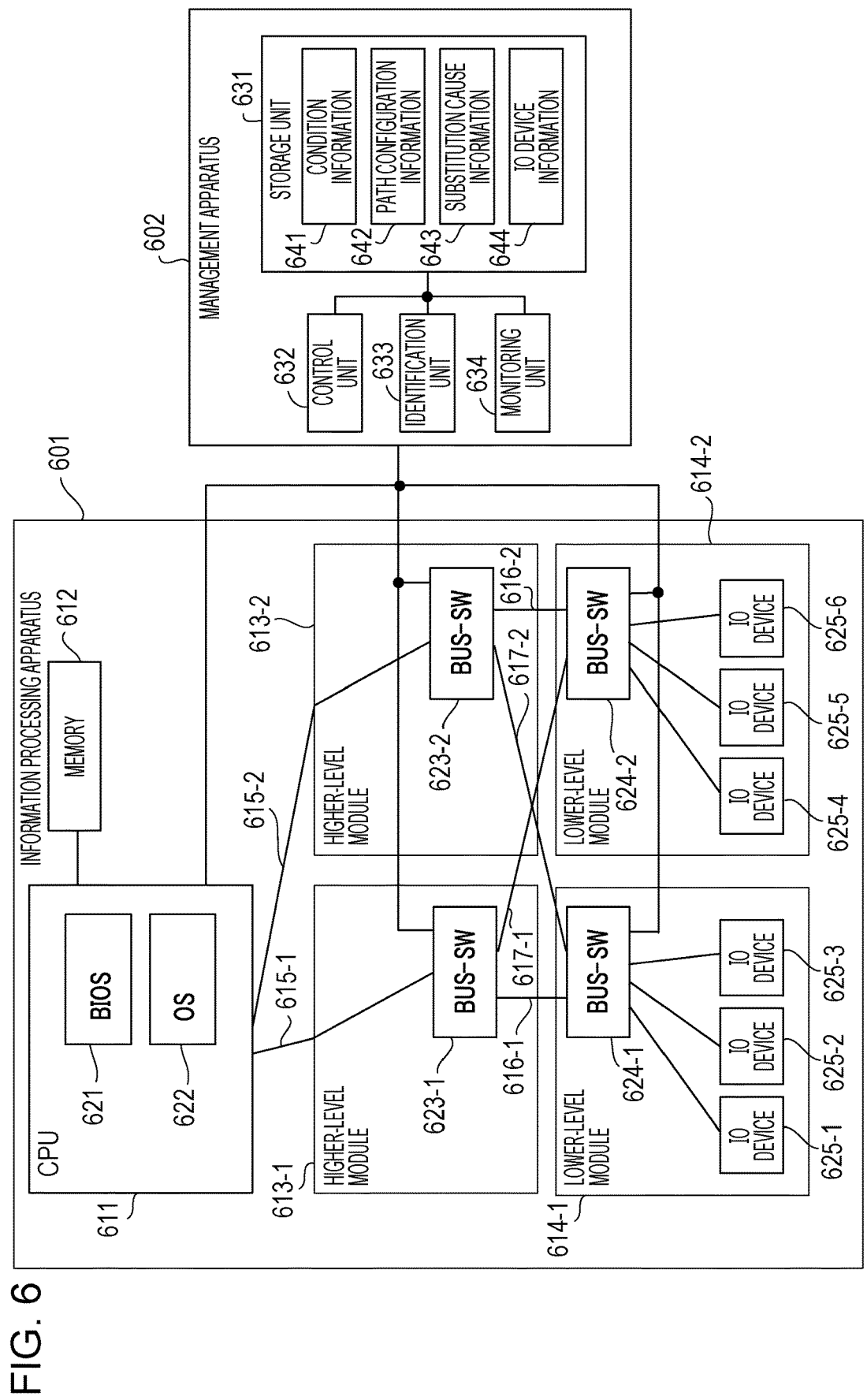
FIG. 6 is a configuration diagram of an information processing system.

FIG. 6 illustrates a configuration example of an information processing system including the management apparatus 401 in FIG. 4. The information processing system in FIG. 6 includes an information processing apparatus 601 and a management apparatus 602. The information processing apparatus 601 includes a CPU 611, a memory 612, a higher-level module 613-1, a higher-level module 613-2, a lower-level module 614-1, and a lower-level module 614-2.

Each of the higher-level module 613-$i$ and the lower-level module 614-$i$ (i=1, 2) is a unit to be replaced for maintenance such as a field-replaceable unit (FRU). The numbers of higher-level modules 613-$i$ and the number of lower-level modules 614-$i$ are not limited to 2, but may be 3 or more.

The CPU 611 executes a BIOS 621, an OS 622, and an application program, not illustrated, by using the memory 612. During the execution, the CPU 611 is able to send commands to the management apparatus 602 and receive responses from the management apparatus 602 through signal lines. At the start-up of the information processing apparatus 601, the CPU 611 first performs initialization and setting of the hardware by executing the BIOS 621, and then executes the OS 622.

Each higher-level module 613-$i$ includes a BUS-SW 623-$i$ serving as a higher-level bus switch. The lower-level module 614-1 includes a BUS-SW 624-1 serving as a lower-level bus switch, and IO devices 625-1 to 625-3. The lower-level module 614-2 includes a BUS-SW 624-2 serving as a lower-level bus switch, and IO devices 625-4 to 625-6.

Each IO device 625-$j$ (j=1 to 6) is, for example, a network interface, a storage interface, an external interface, a video card, a sound card, or the like, and is mounted in an IO slot of the lower-level module 614-$i$.

The CPU 611 and the BUS-SW 623-1 are coupled to each other through a signal line 615-1 and the CPU 611 and the BUS-SW 623-2 are coupled to each other through a signal line 615-2.

Redundant paths are provided between the BUS-SWs 623-$i$ and the BUS-SWs 624-$i$, and each BUS-SW 623-$i$ is coupled to both of the BUS-SW 624-1 and the BUS-SW 624-2. The BUS-SW 623-1 and the BUS-SW 624-1 are coupled to each other through a signal line 616-1 and the BUS-SW 623-1 and the BUS-SW 624-2 are coupled to each other through a signal line 617-1. The BUS-SW 623-2 and the BUS-SW 624-2 are coupled to each other through a signal line 616-2 and the BUS-SW 623-2 and the BUS-SW 624-1 are coupled to each other through a signal line 617-2.

The IO devices 625-1 to 625-3 are coupled to the BUS-SW 624-1 and the IO devices 625-4 to 625-6 are coupled to the BUS-SW 624-2.

In this case, the BUS-SW 623-1 or the BUS-SW 623-2 and the BUS-SW 624-1 are present on the path from the CPU 611 to each IO device 625-$j$ (j=1 to 3). Meanwhile, the BUS-SW 623-1 or the BUS-SW 623-2 and the BUS-SW 624-2 are present on the path from the CPU 611 to each IO device 625-$j$ (j=4 to 6).

The management apparatus 202 corresponds to the management apparatus 401 in FIG. 4, and includes a storage unit 631, a control unit 632, an identification unit 633, and a monitoring unit 634. The storage unit 631 stores condition information 641, path configuration information 642, substitution cause information 643, and IO device information 644.

The path configuration information 642 corresponds to the path configuration information 421 in FIG. 4 and is information specifying two or more path configurations from the CPU 611 to the IO devices 625-1 to 625-6. Each path configuration is expressed, for example, by a topology of links between the BUS-SWs 623-$i$ and the BUS-SWs 624-$i$.

The condition information 641 is information indicating the current path configuration of the information processing apparatus 601 among the path configurations specified in the path configuration information 642, and the substitution cause information 643 is information specifying an IO device being accessed at a time of detection of an error. The IO device information 644 is information specifying IO devices 625-$j$ coupled to each BUS-SW 624-$i$.

The control unit 632 corresponds to the control unit 412 in FIG. 4, and manages the path configuration of the information processing apparatus 601. The control unit 632 activates or inactivates the ports included in the BUS-SWs 623-$i$ and the BUS-SWs 624-$i$ based on the condition information 641 and the path configuration information 642 and thereby enables or disables the links of the ports. In this way, the control unit 632 is capable of changing the path configuration of the information processing apparatus 601 to another path configuration by changing the topology of the links between the BUS-SWs 623-$i$ and the BUS-SWs 624-$i$.

The identification unit 633 corresponds to the identification unit 413 in FIG. 4, identifies a suspect component included in the path configuration based on the error information of the IO device 625-$j$ and executes processing of disconnecting the suspect component thus identified. The identification unit 633 outputs a system event log (SEL) specifying the identified suspect component to notify a user of the occurrence of the error.

The monitoring unit 634 receives an error report of an IO error or the like from the BIOS 621 or the OS 622, and notifies the identification unit 633 that the error is detected. The management apparatus 202 controls power supply to the information processing apparatus 601 and controls reset processing of the information processing apparatus 601.

FIGS. 7A to 7D illustrate examples of information stored in the management apparatus 602 in FIG. 6. FIG. 7A illustrates an example of the condition information 641. An entry number en in Condition in FIG. 7A is a pointer indicating any one of entries in the path configuration information 642 in FIG. 7B.

FIG. 7B illustrates an example of the path configuration information 642. Each entry in the path configuration information 642 in FIG. 7B is composed of an entry number, a mode, a target switch number, a BUS # List, and a port activation status list.

Each of the entry numbers "1" to "N" (N is an integer of 7 or more) is identification information of an entry, and the mode specifies a type of the path configuration. A mode "1" represents a normal configuration, a mode "2" represents a substitute configuration, a mode "3" represents a degenerate configuration, and a mode "0xFF" represents the end of the path configuration information 642.

Figure 8:
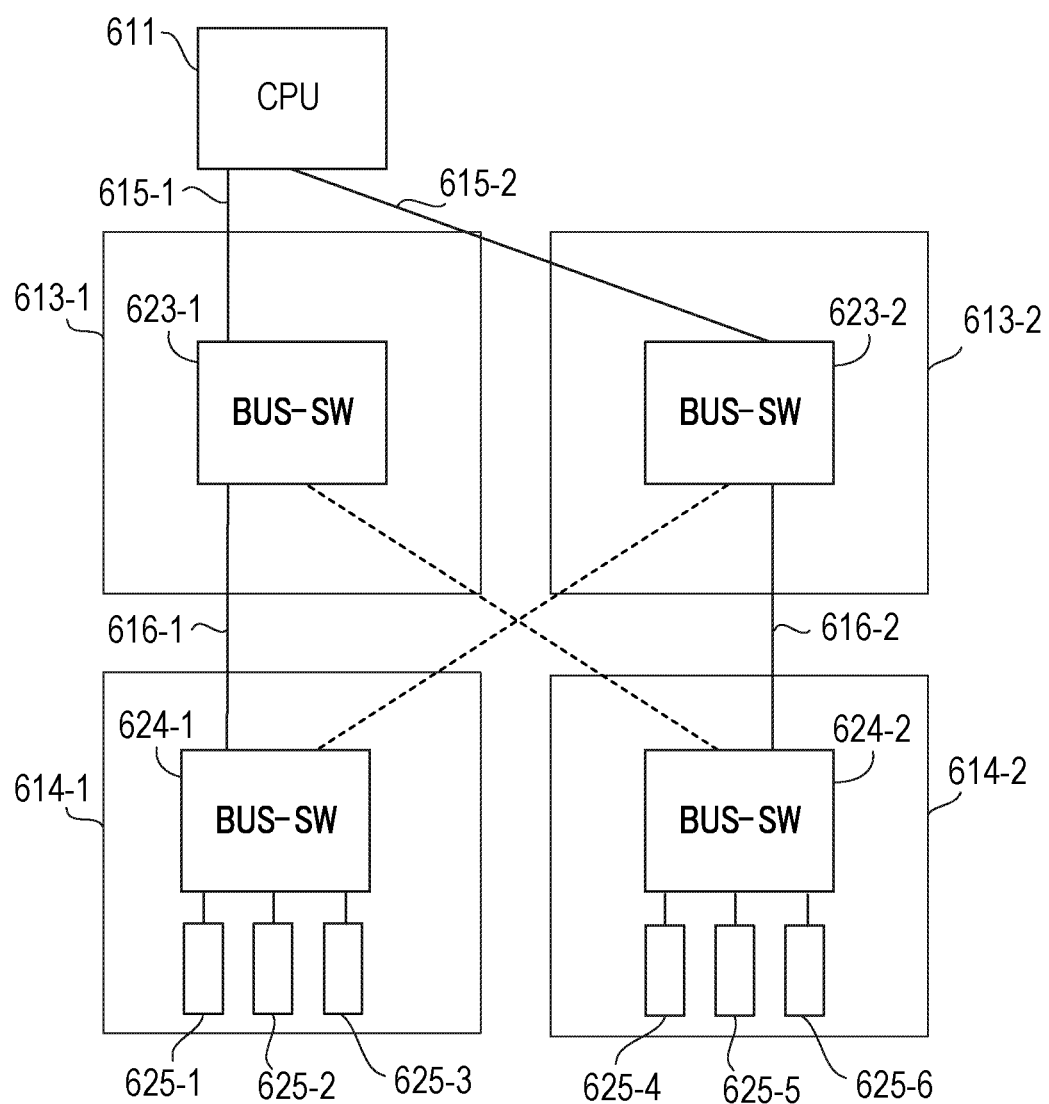
FIG. 8 is a diagram illustrating a normal configuration.

FIG. 8 illustrates an example of the normal configuration of the information processing apparatus 601 in FIG. 6. In the normal configuration in FIG. 8, the links through the signal line 615-1, the signal line 615-2, the signal line 616-1, and the signal line 616-2 are enabled, and the links through the signal line 617-1 and the signal line 617-2 are disabled. This path configuration serves for the normal configuration of the entry number "1". In the case where an error on the path is detected under the normal configuration, the path configuration is changed to the substitute configuration.

Figure 9:
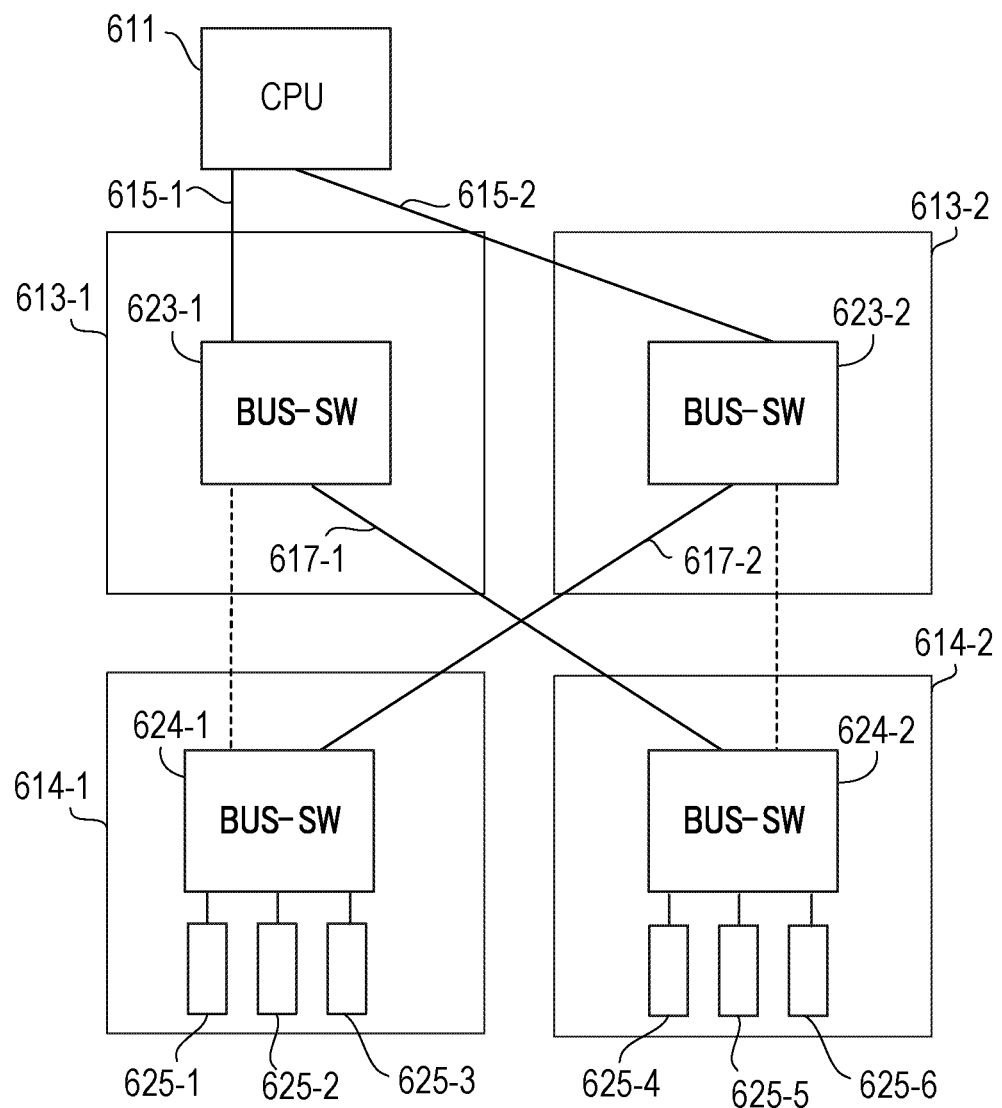
FIG. 9 is a diagram illustrating a substitute configuration.

FIG. 9 illustrates an example of the substitute configuration in the information processing apparatus 601 in FIG. 6. In the substitute configuration in FIG. 9, the links through the signal line 615-1, the signal line 615-2, the signal line 617-1, and the signal line 617-2 are enabled, and the links through the signal line 616-1 and the signal line 616-2 are disabled. This path configuration serves for the substitute configuration of the entry number "2" and the entry number "3". In the case where an error on the path is detected under the substitute configuration and the BUS-SW 623-$i$ is identified as a suspect component, the path configuration is changed to the degenerate configuration.

Figure 10:
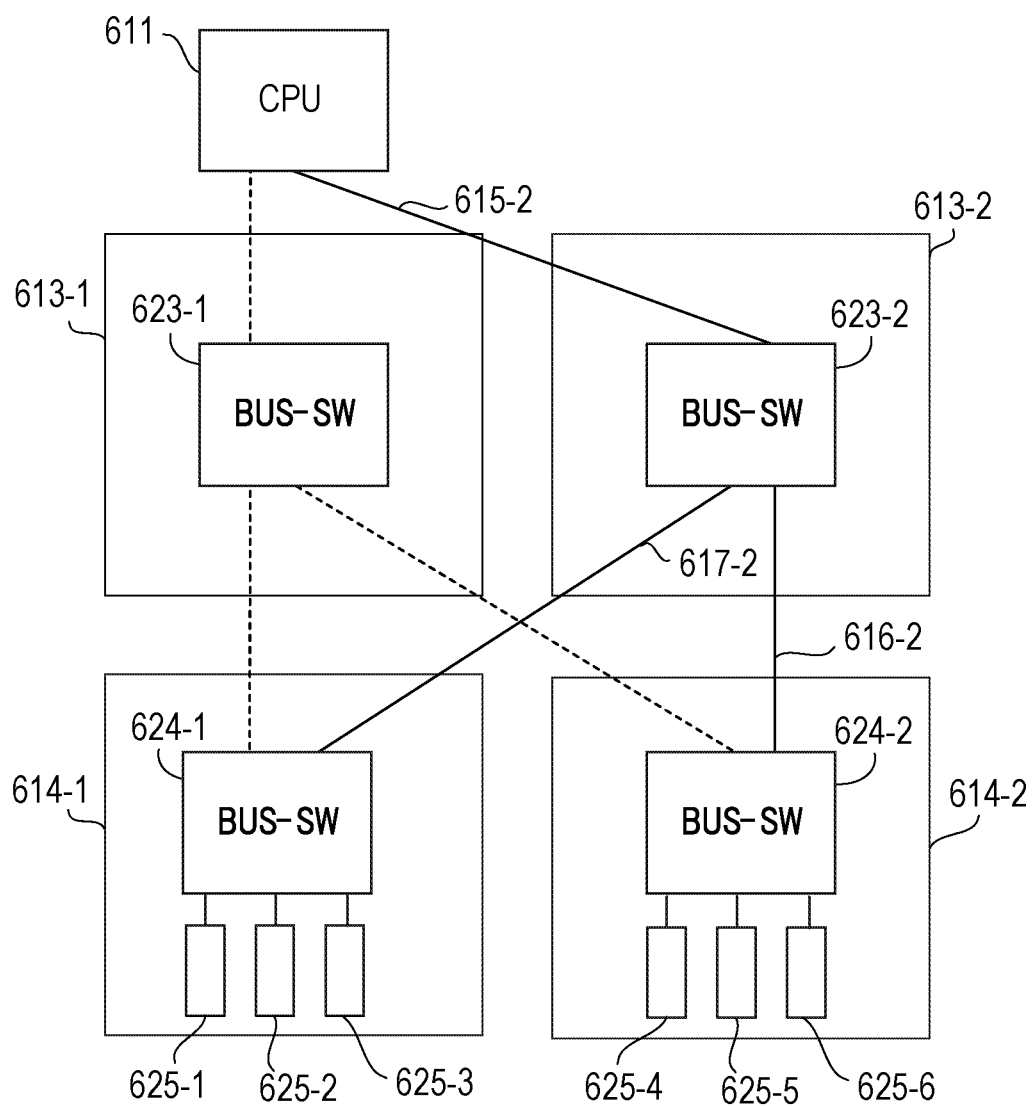
FIG. 10 is a diagram illustrating a degenerate configuration.

FIG. 10 illustrates an example of the degenerate configuration in the information processing apparatus 601 in FIG. 6. The degenerate configuration is a path configuration not using a component identified as a suspect component. The degenerate configuration in FIG. 10 is applied when the BUS-SW 623-1 is the suspect component. In this case, the links through the signal line 615-2, the signal line 616-2, and the signal line 617-2 are enabled, and the links through the signal line 615-1, the signal line 616-1, and the signal line 617-1 are disabled. Thus, the BUS-SW 623-1 is disconnected, and the information processing apparatus 601 operates in the degenerate configuration. This path configuration serves for the degenerate configuration of the entry number "5".

The target switch number in FIG. 7B specifies a switch number representing a BUS-SW which may probably have a failure in each path configuration. In the target switch number, "0xFF" in the normal configuration indicates that there is no possibility that any of the BUS-SWs has a failure, "1" in the substitute configuration represents the BUS-SW 624-1, and "2" in the substitute configuration represents the BUS-SW 624-2. The target switch number in the degenerate configuration is a switch number of a BUS-SW identified as a suspect component, and "1" represents the BUS-SW 623-1 while "2" represents the BUS-SW 623-2.

The BUS # list indicates a combination of a higher-level primary and a secondary-subordinate of each BUS-SW 623-$i$. The higher-level primary represents a bus number of a BUS-SW 623-$i$ and the secondary-subordinate represents a bus number of a component existing on a lower level side of the BUS-SW 623-$i$.

For example, in the normal configuration in FIG. 8, bus numbers are allocated as follows.
BUS-SW 623-1: 11
BUS-SW 624-1: 12
IO device 625-1: 13
IO device 625-2: 14
IO device 625-3: 15
BUS-SW 623-2: 17
BUS-SW 624-2: 18
IO device 625-4: 19
IO device 625-5: 20
IO device 625-6: 21

Thus, for the BUS-SW 623-1, the higher-level primary is "11" and the secondary-subordinate is "12-15". Meanwhile, for the BUS-SW 623-2, the higher-level primary is "17" and the secondary-subordinate is "18-21".

In the substitute configuration in FIG. 9, bus numbers are allocated as follows.

BUS-SW 623-1: 17
BUS-SW 624-1: 12
IO device 625-1: 13
IO device 625-2: 14
IO device 625-3: 15
BUS-SW 623-2: 11
BUS-SW 624-2: 18
IO device 625-4: 19
IO device 625-5: 20
IO device 625-6: 21

Thus, for the BUS-SW 623-1, the higher-level primary is "17" and the secondary-subordinate is "18-21". Meanwhile, for the BUS-SW 623-2, the higher-level primary is "11" and the secondary-subordinate is "12-15".

In the degenerate configuration in FIG. 10, bus numbers are allocated as follows.
BUS-SW 623-1: 0xFF
BUS-SW 624-1: 12
IO device 625-1: 13
IO device 625-2: 14
IO device 625-3: 15
BUS-SW 623-2: 11
BUS-SW 624-2: 18
IO device 625-4: 19
IO device 625-5: 20
IO device 625-6: 21

Thus, for the BUS-SW 623-1, the higher-level primary is "0xFF" and the secondary-subordinate is "0xFF-0xFF". Meanwhile, for the BUS-SW 623-2, the higher-level primary is "11" and the secondary-subordinate is "12-21".

The port activation status list specifies a combination of an SW-ID, a port-ID, and on/off of each BUS-SW 623-i. The SW-ID is a switch number identifying the BUS-SW 623-i, the port-ID is a number identifying the number of a port on a lower-side of the BUS-SW 623-i, and the on/off is a flag indicating whether or not to activate the port. The port is activated if the on/off is set to "1" or is inactivated if the on/off is set to "0".

In FIG. 6, the switch numbers of the BUS-SW 623-1 and the BUS-SW 623-2 are "1" and "2", respectively. In the BUS-SW 623-1, the numbers of the ports coupled to the signal line 616-1 and the signal line 617-1 are "1" and "2", respectively. In the BUS-SW 623-2, the numbers of the ports coupled to the signal line 616-2 and the signal line 617-2 are "1" and "2", respectively.

For example, the entry of the entry number "1" for the normal configuration in FIG. 8 includes (1,1,1) and (1,2,0) in the port activation status list of the BUS-SW 623-1. Moreover, this entry includes (2,1,1) and (2,2,0) in the port activation status list of the BUS-SW 623-2.

The entry of each of the entry number "2" and the entry number "3" for the substitute configuration in FIG. 9 includes (1,1,0) and (1,2,1) in the port activation status list of the BUS-SW 623-1. Moreover, this entry includes (2,1,0) and (2,2,1) in the port activation status list of the BUS-SW 623-2.

The entry of the entry number "5" for the degenerate configuration in FIG. 10 includes (1,1,0) and (1,2,0) in the port activation status list of the BUS-SW 623-1. Moreover, this entry includes (2,1,1) and (2,2,1) in the port activation status list of the BUS-SW 623-2.

The control unit 632 checks the conditions of the information processing apparatus 601 when the management apparatus 602 is started up, and updates the path configuration information 642 if a change in the higher-level modules 613-i or the lower-level modules 614-i mounted on the information processing apparatus 601 is recognized.

FIG. 7C illustrates an example of the substitution cause information 643. BUS # specifies a bus number contained in the error information of an IO device 625-j, DEV # specifies a device number contained in the error information, and the combination of BUS # and DEV # is an address string of the error-detected IO device 625-j. For example, when the monitoring unit 634 receives the error information containing the address string "14.0" of the IO device 625-2, the identification unit 633 records "14" and "0" as BUS # and DEV #, respectively, in the substitution cause information 643.

FIG. 7D illustrates an example of the IO device information 644. Each entry of the IO device information 644 in FIG. 7D includes switch number, primary, port1, port2, and port3.

The switch number is a switch number identifying a BUS-SW 624-i, the primary specifies a bus number of the BUS-SW 624-i, and the port1 to port3 are address strings of three IO devices 625-j coupled to the BUS-SW 624-i.

The BUS-SW 624-1 has a switch number "1" and primary "12". The address strings of the IO devices 625-1, 625-2, and 625-3 coupled to the BUS-SW 624-1 are "13.0", "14.0", and "15.0", respectively.

Meanwhile, the BUS-SW 624-2 has a switch number "2" and primary "18". The address strings of the IO devices 625-4, 625-5, and 625-6 coupled to the BUS-SW 624-2 are "19.0", "20.0", and "21.0", respectively.

In this case, since the device numbers of all the IO devices 625-j are "0", each IO device 625-j is identified by the bus number contained in the address string. The primary "0xFF" indicates the end of the IO device information 644.

By executing the BIOS 621, the CPU 611 is able to access the management apparatus 602, and read the condition information 641, the path configuration information 642, the substitution cause information 643, and the IO device information 644 from the management apparatus 602. By reading the condition information 641 and the path configuration information 642, the CPU 611 is able to recognize the current path configuration of the information processing apparatus 601.

The control unit 632 of the management apparatus 602 changes the path configuration of the information processing apparatus 601 by controlling the statuses of the ports of the BUS-SWs 623-i and the BUS-SWs 624-i based on the path configuration information 642.

For example, when the port of the port number "1" of the BUS-SW 623-1 is activated, the link through the signal line 616-1 is enabled to make the signal line 616-1 usable. On the other hand, when the above port is inactivated, the link through the signal line 616-1 is disabled. Then, when the port of the port number "2" of the BUS-SW 623-1 is activated, the link through the signal line 617-1 is enabled to make the signal line 617-1 usable. On the other hand, when the above port is inactivated, the link through the signal line 617-1 is disabled.

The links through the signal line 616-2 and the signal line 617-2 are controlled in the same way as the links through the signal line 616-1 and the signal line 617-1.

The management apparatus 602 determines only one path configuration from the path configurations of the information processing apparatus 601 during the configuration initialization, and controls the information processing apparatus 601 such that the only one path configuration is enabled while the information processing apparatus 601 is operating. Then, when an IO error occurs, the management apparatus 602 narrows down suspect components by changing the path configuration to another path configuration. This operation makes it possible to efficiently identify which one of the BUS-SWs on the path and the IO device is a faulty component, and shorten the time until the problem is solved.

In addition, the changeover of the path configuration also makes it possible to reliably narrow down suspect components not only in the case where a stationary IO error repeatedly occurs, but also even in the case where an IO error intermittently occurs.

Next, error control processing executed by the management apparatus 602 is described in detail with reference to FIGS. 11 to 16.

Figure 11:
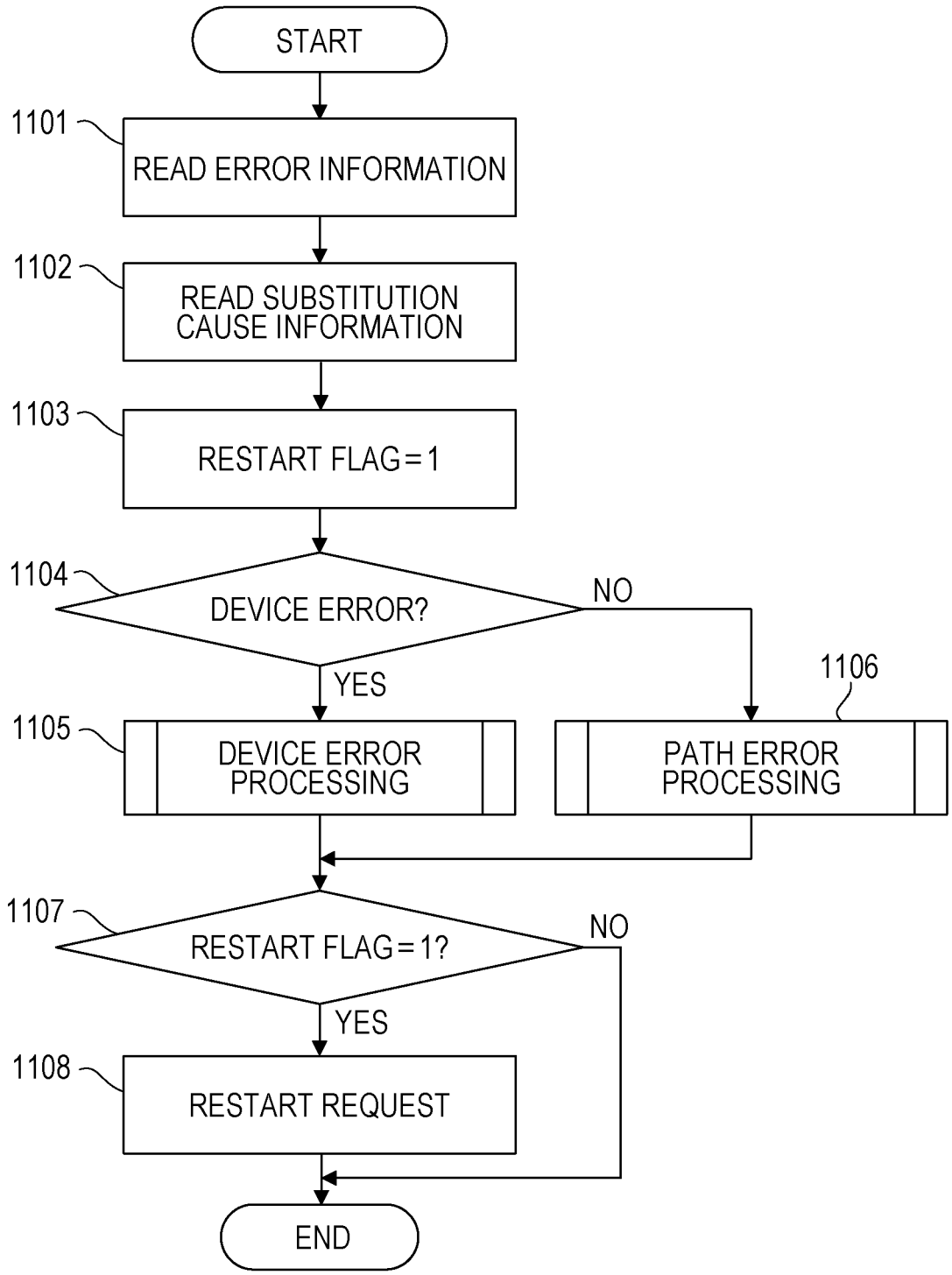
FIG. 11 is a flowchart of error control processing.

FIG. 11 is a flowchart illustrating an example of the error control processing executed by the management apparatus 602. The error control processing in FIG. 11 is started when the monitoring unit 634 receives an error report from the BIOS 621 or the OS 622.

First, the identification unit 633 reads the error information from the error report (step 1101), and reads the substitution cause information 643 from the storage unit 631 (step 1102). Then, the identification unit 633 sets the restart flag to a logical value "1" (step 1103), and checks whether or not the error information in the error report indicates a device error (step 1104).

For example, according to the specifications of PCI, an error bit is contained in a status register in an IO device, and the error bit indicates an error of the IO device when the logical value in the error bit is "1". This error bit is also contained in the error report received by the monitoring unit 634. Thus, the identification unit 633 determines that the error information indicates the device error when the error bit has a logical value "1", and that the error information does not indicate the device error when the error bit has a logical value "0".

If the error information indicates the device error (step 1104, YES), the management apparatus 602 identifies the IO device specified by the error information as a suspect component, and performs device error processing (step 1105). On the other hand, if the error information does not indicate the device error (step 1104, NO), the management apparatus 602 determines that the error on the path occurs and performs path error processing (step 1106).

Subsequently, the identification unit 633 checks whether or not the restart flag has the logical value "1" (step 1107). If the restart flag has the logical value "1" (step 1107, YES), the identification unit 633 sends a restart request to the CPU 611 (step 1108). On the other hand, if the restart flag has the logical value "0" (step 1107, NO), the identification unit 633 terminates the processing.

Figure 12:
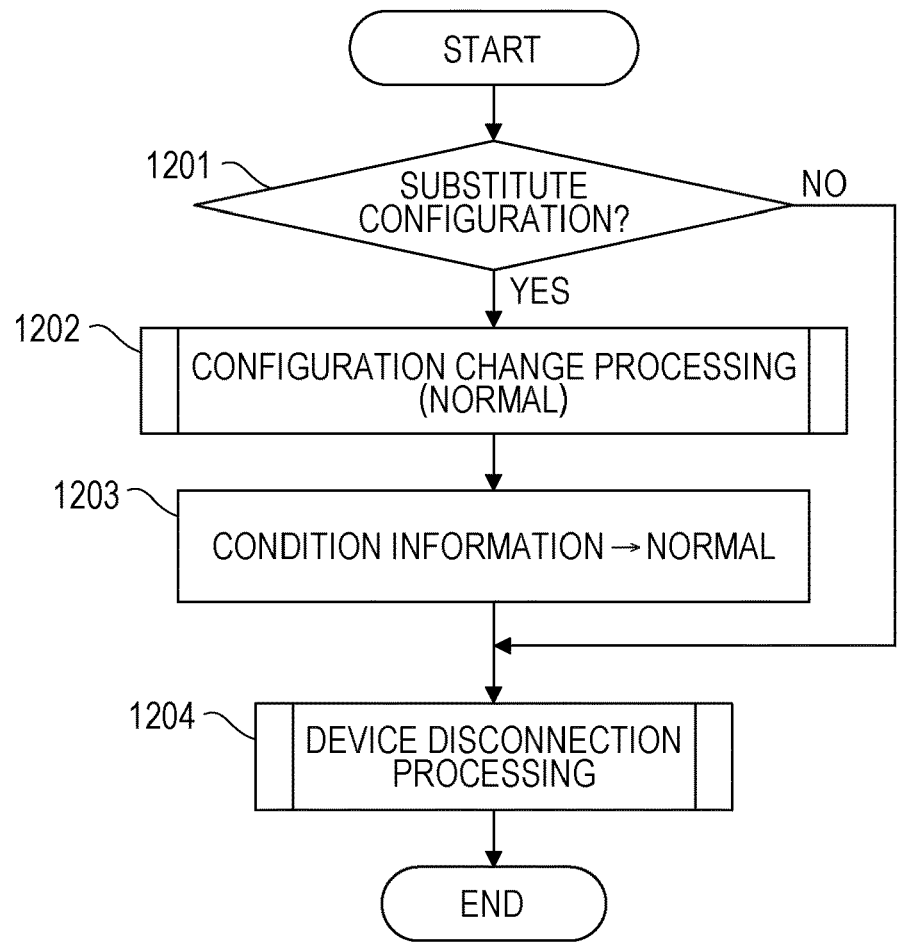
FIG. 12 is a flowchart of device error processing.

FIG. 12 is a flowchart illustrating an example of the device error processing at step 1105 in FIG. 11. First, the control unit 632 checks whether or not the entry number en in the condition information 641 indicates the substitute configuration (step 1201). If the entry number en is "2" or "3", the control unit 632 determines that the entry number en indicates the substitute configuration.

If the entry number en indicates the substitute configuration (step 1201, YES), the control unit 632 performs configuration change processing to change the path configuration of the information processing apparatus 601 to the normal configuration (step 1202). Then, the control unit 632 changes the entry number en in the condition information 641 to the entry number "1" that indicates the normal configuration (step 1203), and executes device disconnection processing (step 1204).

If the entry number en indicates the normal configuration or the degenerate configuration (step 1201, NO), the control unit 632 executes the device disconnection processing (step 1204).

Figure 13:
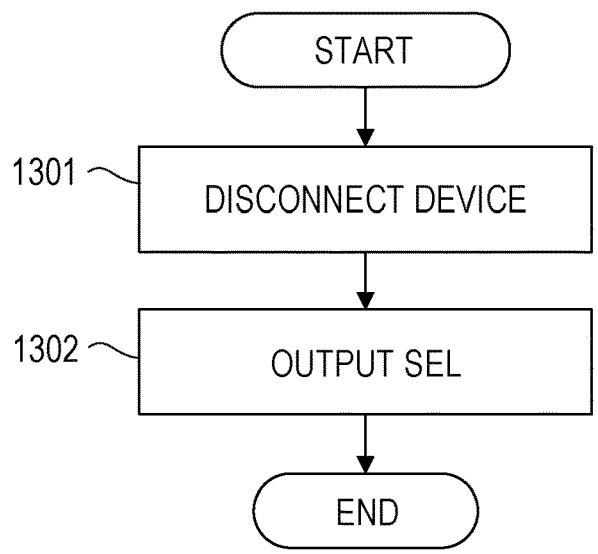
FIG. 13 is a flowchart of device disconnection processing.

FIG. 13 is a flowchart illustrating an example of the device disconnection processing at step 1204 in FIG. 12. First, the control unit 632 disconnects the IO device specified by the error information from the path configuration (step 1301). For example, the control unit 632 may disconnect the IO device by inactivating the port of the BUS-SW specified by the address string in the error information.

Next, the identification unit 633 outputs an SEL indicating that the IO device as the suspect component is disconnected (step 1302).

Figure 14:
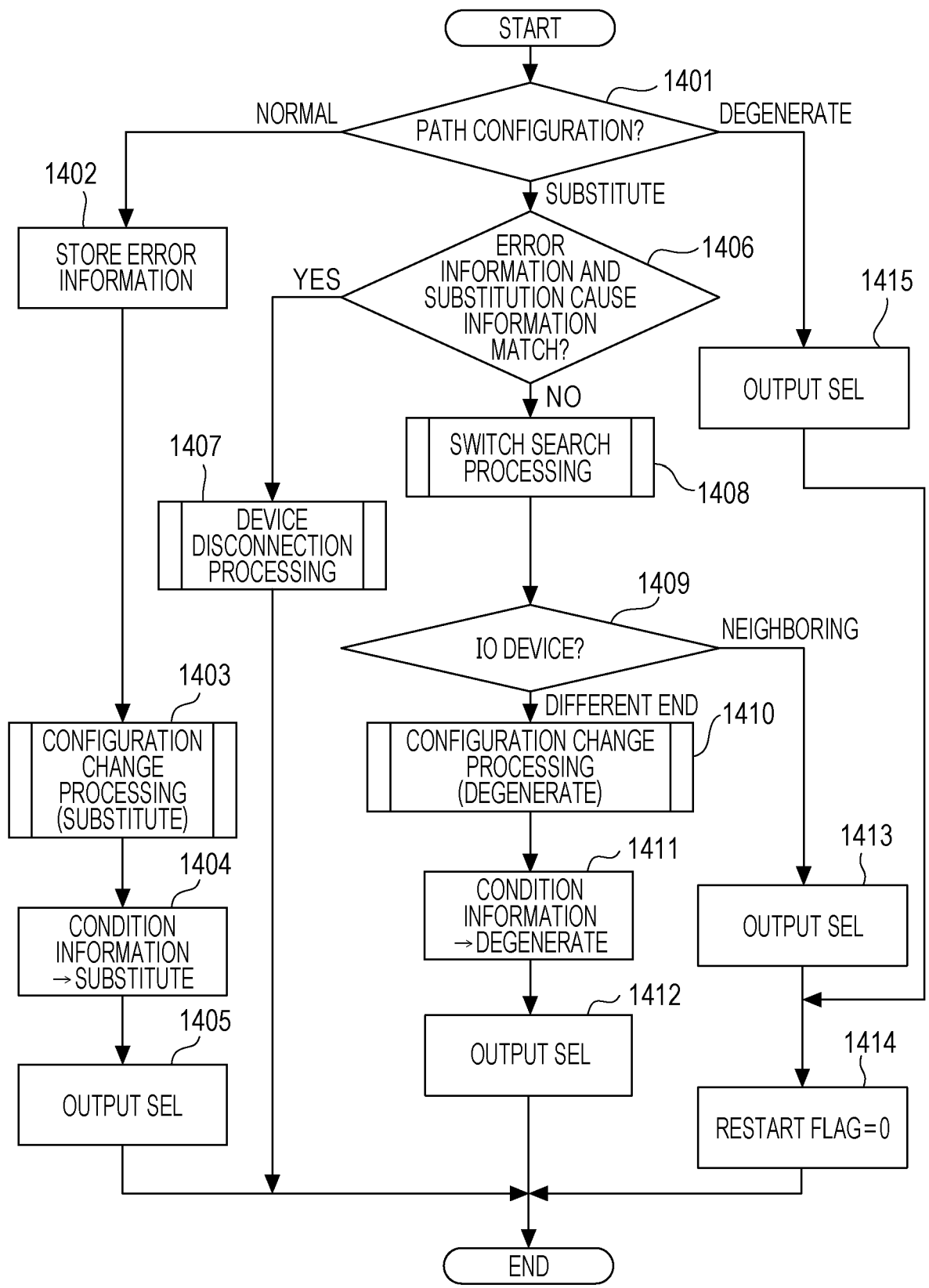
FIG. 14 is a flowchart of path error processing.

FIG. 14 is a flowchart illustrating an example of the path error processing at step 1106 in FIG. 11. First, the control unit 632 checks the path configuration indicated by the entry number en in the condition information 641 (step 1401).

If the entry number en indicates the normal configuration (step 1401, normal), the identification unit 633 stores the address string in the error information contained in the error report as the substitution cause information 643 (step 1402). Then, the control unit 632 executes the configuration change processing by using the switch number of the BUS-SW specified by the address string in the error information as a target switch number, and changes the path configuration of the information processing apparatus 601 to the substitute configuration (step 1403).

Subsequently, the control unit 632 changes the entry number en in the condition information 641 to the entry number indicating the substitute configuration (step 1404), and the identification unit 633 outputs an SEL indicating that the path configuration is changed to the substitute configuration (step 1405).

If the entry number en indicates the substitute configuration (step 1401, substitute), the identification unit 633 compares the error information and the substitution cause information 643 (step 1406). If the bus number and the device number in the address string in the error information are the same as the BUS # and the DEV # in the substitution cause information 643, respectively, the identification unit 633 determines that the error information and the substitution cause information 643 match each other. On the other hand, if the bus number and the BUS # are different or if the device number and the DEV # are different, the identification unit 633 determines that the error information and the substitution cause information 643 do not match each other.

If the error information and the substitution cause information 643 match each other (step 1406, YES), the management apparatus 602 identifies the IO device specified by the error information as the suspect component, and executes the device disconnection processing in FIG. 13 (step 1407).

On the other hand, if the error information and the substitution cause information 643 do not match each other (step 1406, NO), the identification unit 633 executes switch search processing (step 1408). Then, the identification unit 633 determines whether the IO device specified by the error information is a different-end IO device or a neighboring IO device (step 1409).

The neighboring IO device is another IO device coupled to the BUS-SW to which the IO device specified by the substitution cause information 643 is coupled. The different-end IO device is another IO device coupled to a BUS-SW different from the BUS-SW to which the IO device specified by the substitution cause information 643 is coupled.

For example, when the substitution cause information 643 indicates the IO device 625-1 in FIG. 6, the IO devices 625-2 and 625-3 are neighboring IO devices and the IO devices 625-4 to 625-6 are different-end IO devices.

If the IO device specified by the error information is a different-end IO device (step 1409, different end), the identification unit 633 identifies, as a suspect component, a higher-level BUS-SW included in common in the path in which the error is detected in the normal configuration and the path in which the error is detected in the substitute configuration.

For example, assume the case where an IO error of the IO device 625-1 is detected in the normal configuration in FIG. 8. The path from the CPU 611 to the IO device 625-1 includes the BUS-SW 623-1, the BUS-SW 624-1, and the IO device 625-1.

Then, assume the case where an IO error of the IO device 625-5 is detected in the substitute configuration in FIG. 9. The path from the CPU 611 to the IO device 625-5 includes the BUS-SW 623-1, the BUS-SW 624-2, and the IO device 625-5. Since the higher-level BUS-SW included in common in both of the paths is the BUS-SW 623-1, the BUS-SW 623-1 is identified as the suspect component.

If the higher-level BUS-SW is identified as the suspect component, the control unit 632 executes the configuration change processing by using the switch number of the BUS-SW being the suspect component as the target switch number, and changes the path configuration of the information processing apparatus 601 to the degenerate configuration (step 1410).

Subsequently, the control unit 632 changes the entry number en in the condition information 641 to the entry number indicating the degenerate configuration (step 1411), and the identification unit 633 outputs an SEL specifying the suspect component (step 1412).

If the IO device specified by the error information is a neighboring IO device (step 1409, neighboring), the identification unit 633 identifies, as a suspect component, a lower-level BUS-SW included in common in the path in which the error is detected in the normal configuration and the path in which the error is detected in the substitute configuration.

For example, assume the case where an IO error of the IO device 625-1 is detected in the normal configuration in FIG. 8. The path from the CPU 611 to the IO device 625-1 includes the BUS-SW 623-1, the BUS-SW 624-1, and the IO device 625-1.

Then, assume the case where an IO error of the IO device 625-2 is detected in the substitute configuration in FIG. 9. The path from the CPU 611 to the IO device 625-2 includes the BUS-SW 623-2, the BUS-SW 624-1, and the IO device 625-2. Since the lower-level BUS-SW included in common in both of the paths is the BUS-SW 624-1, the BUS-SW 624-1 is identified as the suspect component.

If the lower-level BUS-SW is identified as the suspect component, the identification unit 633 outputs an SEL specifying the suspect component (step 1413), and sets the restart flag to the logical value "0" (step 1414).

If the entry number en indicates the degenerate configuration (step 1401, degeneration), the identification unit 633 outputs an SEL indicating the occurrence of multiple switch errors (step 1415), and sets the restart flag to the logical value "0" (step 1414).

Figure 15:
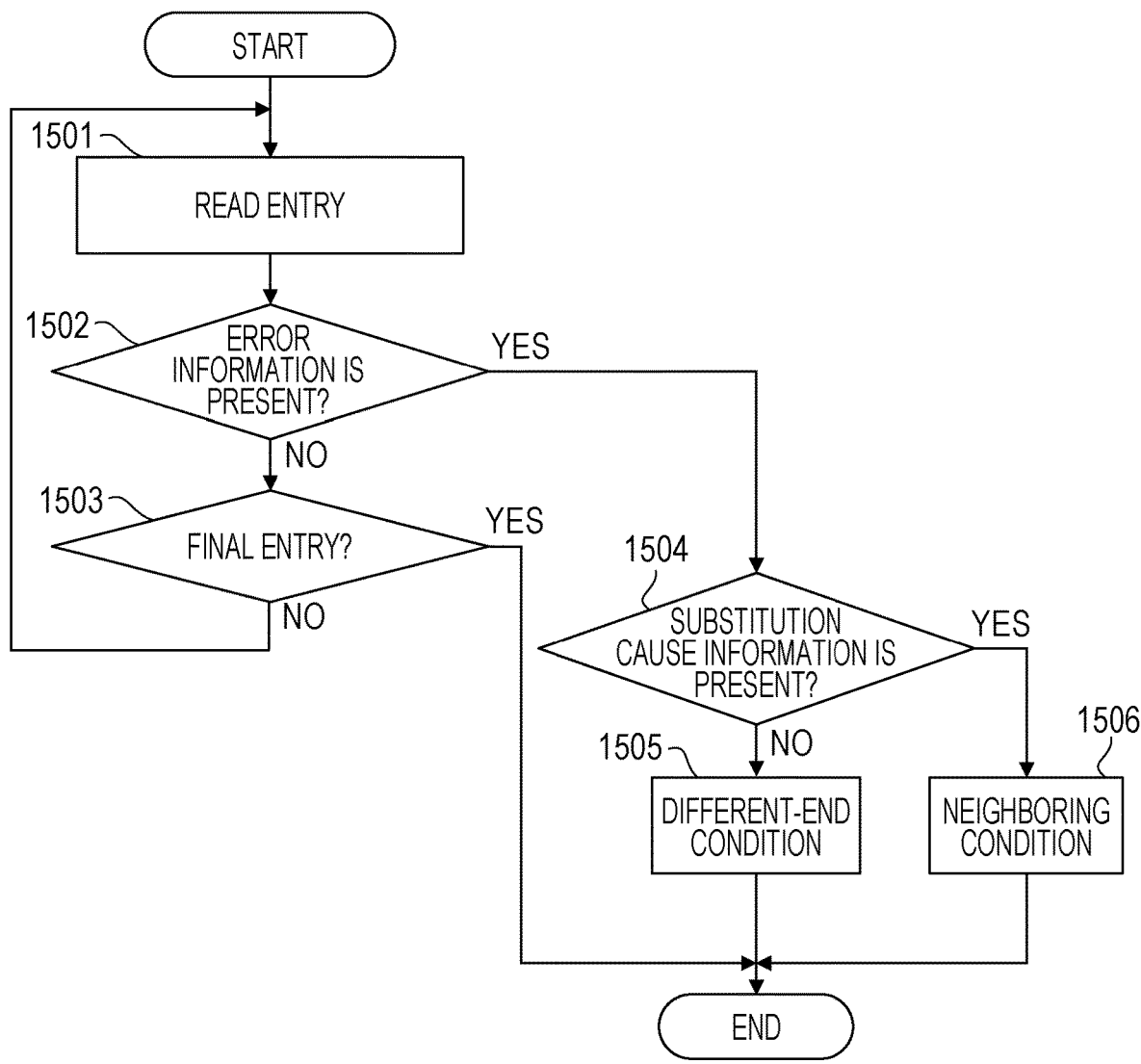
FIG. 15 is a flowchart of switch search processing.

FIG. 15 is a flowchart illustrating an example of the switch search processing at step 1408 in FIG. 14. First, the identification unit 633 reads the first entry in the IO device information 644 (step 1501), and checks whether the read entry contains the address string in the error information (step 1502).

If the read entry does not contain the address string in the error information (step 1502, NO), the identification unit 633 checks whether or not the read entry is the final entry (step 1503). If the read entry is not the final entry (step 1503, NO), the identification unit 633 iterates the processing at and after step 1501 for the next entry. On the other hand, if the read entry is the final entry (step 1503, YES), the identification unit 633 terminates the processing.

If the read entry contains the address string in the error information (step 1502, YES), the identification unit 633 checks whether the read entry contains the address string specified in the substitution cause information 643 (step 1504).

If the read entry does not contain the address string specified in the substitution cause information 643 (step 1504, NO), the identification unit 633 determines that a different end condition is satisfied (step 1505). On the other hand, if the read entry contains the address string specified in the substitution cause information 643 (step 1504, YES), the identification unit 633 determines that a neighboring condition is satisfied (step 1506).

At step 1409 in FIG. 14, the identification unit 633 determines that the IO device specified in the error information is a different-end IO device if the different end condition is satisfied, and determines that the IO device specified in the error information is a neighboring IO device if the neighboring condition is satisfied.

One example is described for the case where the address string in the error information is "20.0" and the address string specified in the substitution cause information 643 is "13.0". In this case, in the IO device information 644 in FIG. 7D, the entry of the switch number "2" contains the address string "20.0" in the error information. This entry, however, does not contain the address string "13.0" specified in the substitution cause information 643 and therefore the different end condition is determined as being satisfied.

Another example is described for the case where the address string in the error information is "14.0" and the address string specified in the substitution cause information 643 is "13.0". In this case, in the IO device information 644 in FIG. 7D, the entry of the switch number "1" contains the address string "14.0" in the error information. This entry also contains the address string "13.0" specified in the substitution cause information 643 and therefore the neighboring condition is determined as being satisfied.

As described above, according to the path error processing in FIG. 14, the error information and the substitution cause information 643 are compared to isolate the cause by determining which one of the IO device specified by the error information or the BUS-SWs on the path is a suspect component. Moreover, according to the switch search processing in FIG. 15, whether the IO device specified by the error information and the IO device specified by the substitution cause information 643 are coupled to the same BUS-SWs is checked to identify any one of the BUS-SWs as the suspect component.

Figure 16:
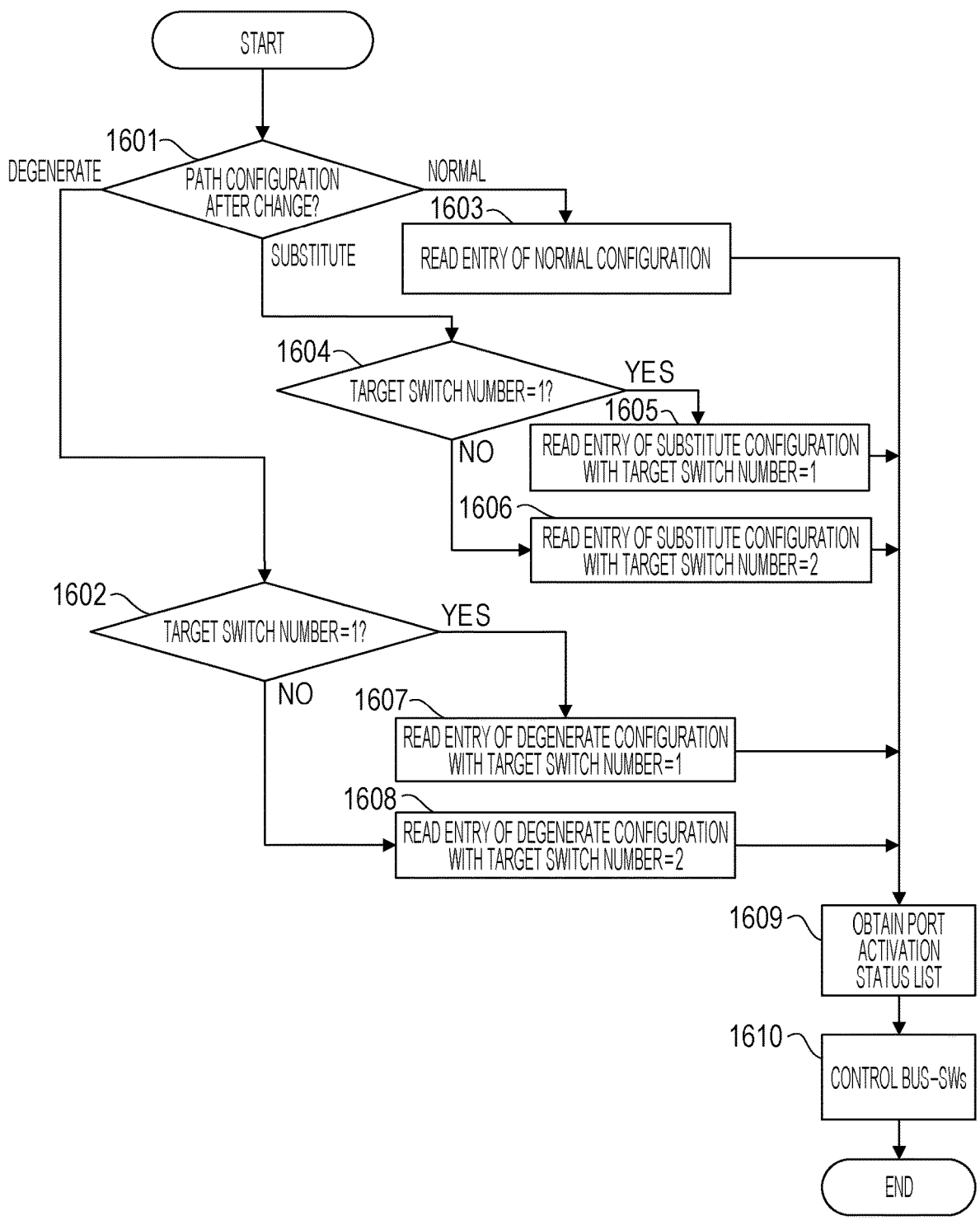
FIG. 16 is a flowchart of configuration change processing.

FIG. 16 is a flowchart illustrating an example of the configuration change processing at step 1202 in FIG. 12 and at steps 1403 and 1410 in FIG. 14. First, the control unit 632 selects the path configuration after change (step 1601). The normal configuration is selected in the configuration change processing at step 1202, the substitute configuration is selected in the configuration change processing at step 1403, and the degenerate configuration is selected in the configuration change processing at step 1410.

If the normal configuration is selected (step 1601, normal), the control unit 632 reads the entry of the normal configuration from the path configuration information 642 (step 1603), and obtains the port activation status list in the read entry (step 1609). Then, the control unit 632 controls the BUS-SWs 623-*i* based on the obtained port activation status list (step 1610). Here, the control unit 632 controls each of the BUS-SWs 623-*i* contained in the port activation status list by activating the port with the on/off set to "1" or inactivating the port with the on/off set to "0".

For example, in the case where the entry of the entry number "1" in FIG. 7B is read, the BUS-SW 623-1 is set such that the port with the port-ID "1" is activated and the port with the port-ID "2" is inactivated. In addition, the BUS-SW 623-2 is set such that the port with the port-ID "1" is activated and the port with the port-ID "2" is inactivated. In this way, the path configuration is changed to the normal configuration in FIG. 8.

In the case where the substitute configuration is selected (step 1601, substitute), the control unit 632 checks the target switch number (step 1604). If the target switch number is "1" (step 1604, YES), the control unit 632 reads the entry of the substitute configuration containing the target switch number "1" from the path configuration information 642 (step 1605), and executes the processing at and after step 1609.

For example, if the entry of the entry number "2" in FIG. 7B is read, the BUS-SW 623-1 is set such that the port with the port-ID "1" is inactivated and the port with the port-ID "2" is activated. Moreover, the BUS-SW 623-2 is set such that the port with the port-ID "1" is inactivated and the port with the port-ID "2" is activated. In this way, the path configuration is changed to the substitute configuration in FIG. 9.

On the other hand, if the target switch number is "2" (step 1604, NO), the control unit 632 reads the entry of the substitute configuration containing the target switch number "2" from the path configuration information 642 (step 1606), and executes the processing at and after step 1609.

In the case where the degenerate configuration is selected (step 1601, degenerate), the control unit 632 checks the target switch number (step 1602). If the target switch number is "1" (step 1602, YES), the control unit 632 reads the entry of the degenerate configuration containing the target switch number "1" from the path configuration information 642 (step 1607), and executes the processing at and after step 1609.

For example, if the entry of the entry number "5" in FIG. 7B is read, the BUS-SW 623-1 is set such that the ports with the port-ID "1" and the port-ID "2" are inactivated. Moreover, the BUS-SW 623-2 is set such that the ports with the port-ID "1" and the port-ID "2" are activated. In this way, the path configuration is changed to the degenerate configuration in FIG. 10.

On the other hand, if the target switch number is "2" (step 1602, NO), the control unit 632 reads the entry of the degenerate configuration containing the target switch number "2" from the path configuration information 642 (step 1608), and executes the processing at and after step 1609.

Next, the POST executed by the CPU 611 in the information processing apparatus 601 is described in detail with reference to FIGS. 17 to 23.

Figure 17:
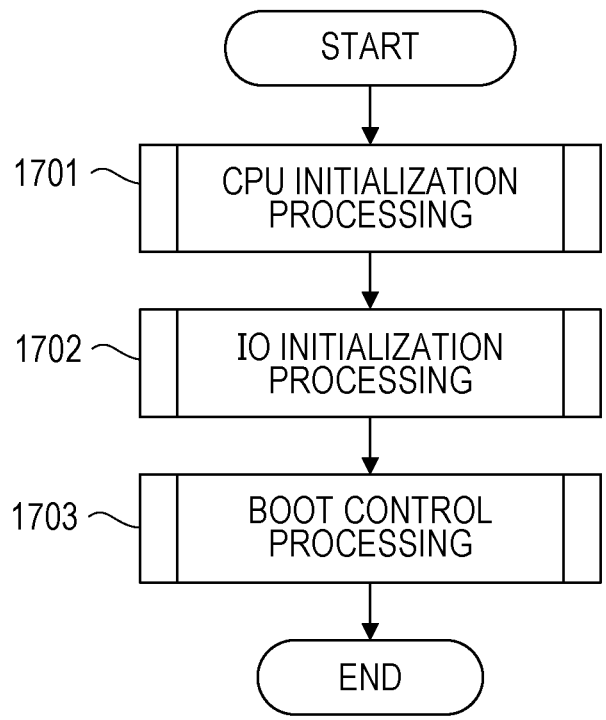
FIG. 17 is a flowchart of POST.

FIG. 17 is a flowchart illustrating an example of the POST executed by the CPU 611 running the BIOS 621. First, the CPU 611 executes CPU initialization processing (step 1701) and executes IO initialization processing (step 1702). Then, the CPU 611 executes boot control processing (step 1703).

Figure 18:
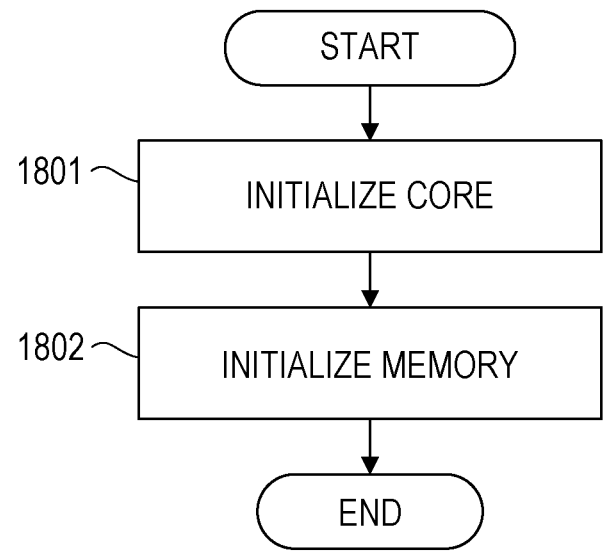
FIG. 18 is a flowchart of CPU initialization processing.

FIG. 18 is a flowchart illustrating an example of the CPU initialization processing at step 1701 in FIG. 17. The CPU 611 initializes the CPU core (step 1801) and initializes the memory 612 (step 1802).

Figure 19:
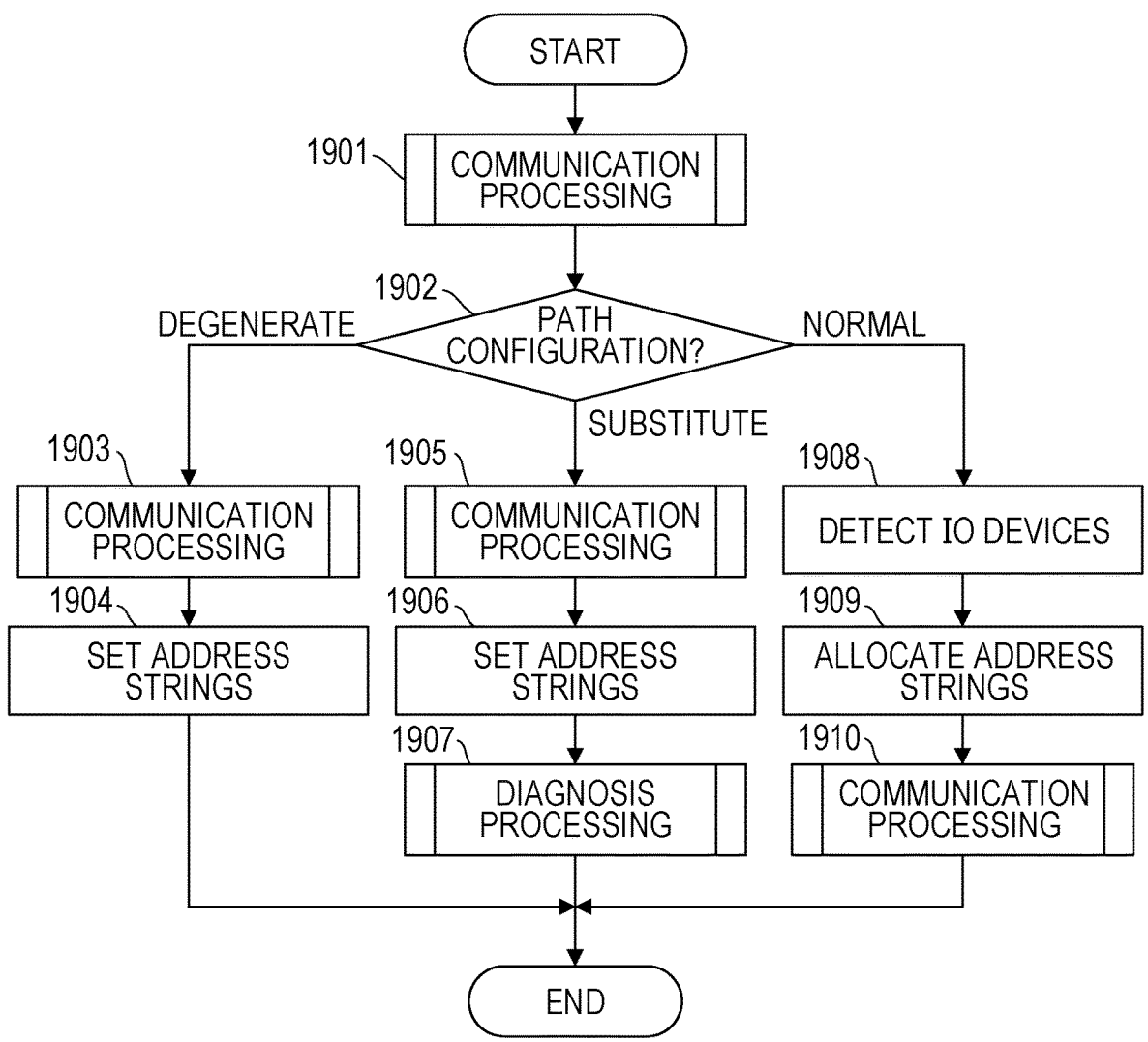
FIG. 19 is a flowchart of IO initialization processing.

FIG. 19 is a flowchart illustrating an example of the IO initialization processing at step 1702 in FIG. 17. First, the CPU 611 performs communication processing to read the condition information 641 from the management apparatus 602 (step 1901), and checks the path configuration indicated by the entry number en in the condition information 641 (step 1902).

If the path configuration indicated by the entry number en is the degenerate configuration (step 1902, degenerate), the CPU 611 performs communication processing to read the IO device information 644 from the management apparatus 602 (step 1903). Then, the CPU 611 sets in a register the address string of each IO device contained in the IO device information 644 (step 1904).

If the path configuration indicated by the entry number en is the substitute configuration (step 1902, substitute), the CPU 611 performs communication processing to read the substitution cause information 643 and the IO device information 644 from the management apparatus 602 (step 1905). Subsequently, the CPU 611 sets in a register the address string of each IO device contained in the IO device information 644 (step 1906).

After that, the CPU 611 selects the entry containing the address string specified in the substitution cause information 643 from the IO device information 644. From the address strings contained in the selected entry, the CPU 611 selects an address string different from the address string specified in the substitution cause information 643, and determined the IO device specified by the selected address string as a neighboring IO device.

Next, the CPU 611 selects an entry containing a switch number different from the switch number in the entry containing the address string specified in the substitution cause information 643 from the IO device information 644. The CPU 611 selects one address string contained in the selected entry, and determines the IO device specified by the selected address string as a different-end IO device.

Then, the CPU 611 performs diagnosis processing by using the IO device specified in the substitution cause information 643 and the neighboring IO device and the different-end IO device, which have been determined (step 1907).

If the path configuration indicated by the entry number en is the normal configuration (step 1902, normal), the CPU 611 searches the IO buses to detect the IO devices mounted on the information processing apparatus 601 (step 1908). Then, the CPU 611 allocates address strings to the detected IO devices and sets the allocated address strings in registers (step 1909). Thereafter, the CPU 611 performs communication processing to send information on the IO devices to the management apparatus 602 (step 1910).

Figure 20:
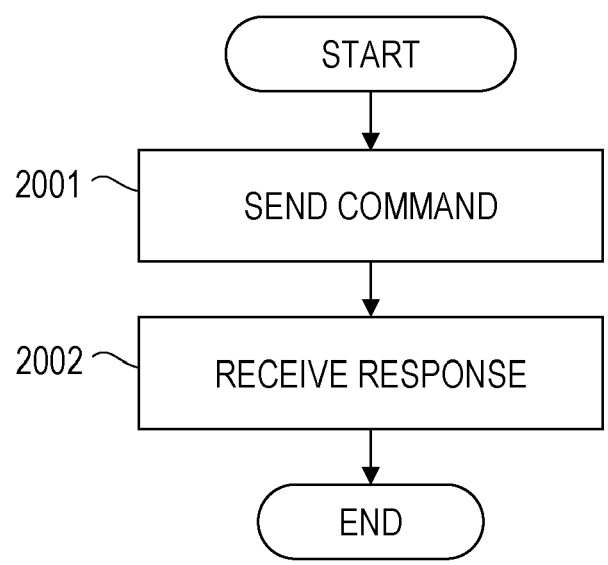
FIG. 20 is a flowchart of communication processing.

FIG. 20 is a flowchart illustrating an example of the communication processing at steps 1901, 1903, 1905, and 1910 in FIG. 19. The CPU 611 sends a command to the management apparatus 602 (step 2001) and receives a response from the management apparatus 602 (step 2002).

In the communication processing at step 1901, the CPU 611 sends a read command to read the condition information 641, and receives a response containing the condition information 641. In the communication processing at step 1903, the CPU 611 sends a read command to read the IO device information 644, and receives a response containing the IO device information 644. In the communication processing at step 1905, the CPU 611 sends a read command to read the substitution cause information 643 and the IO device information 644, and receives a response containing the substitution cause information 643 and the IO device information 644.

In the communication processing at step 1910, the CPU 611 sends a write command to write the information on the IO devices, and receives an acknowledgement indicating the reception of the information. The information sent to the management apparatus 602 includes the switch numbers and the bus numbers of the BUS-SWs coupled to the IO devices and the address strings of the IO devices. The identification unit 633 of the management apparatus 602 stores the received information as the IO device information 644 into the storage unit 631.

Figure 21:
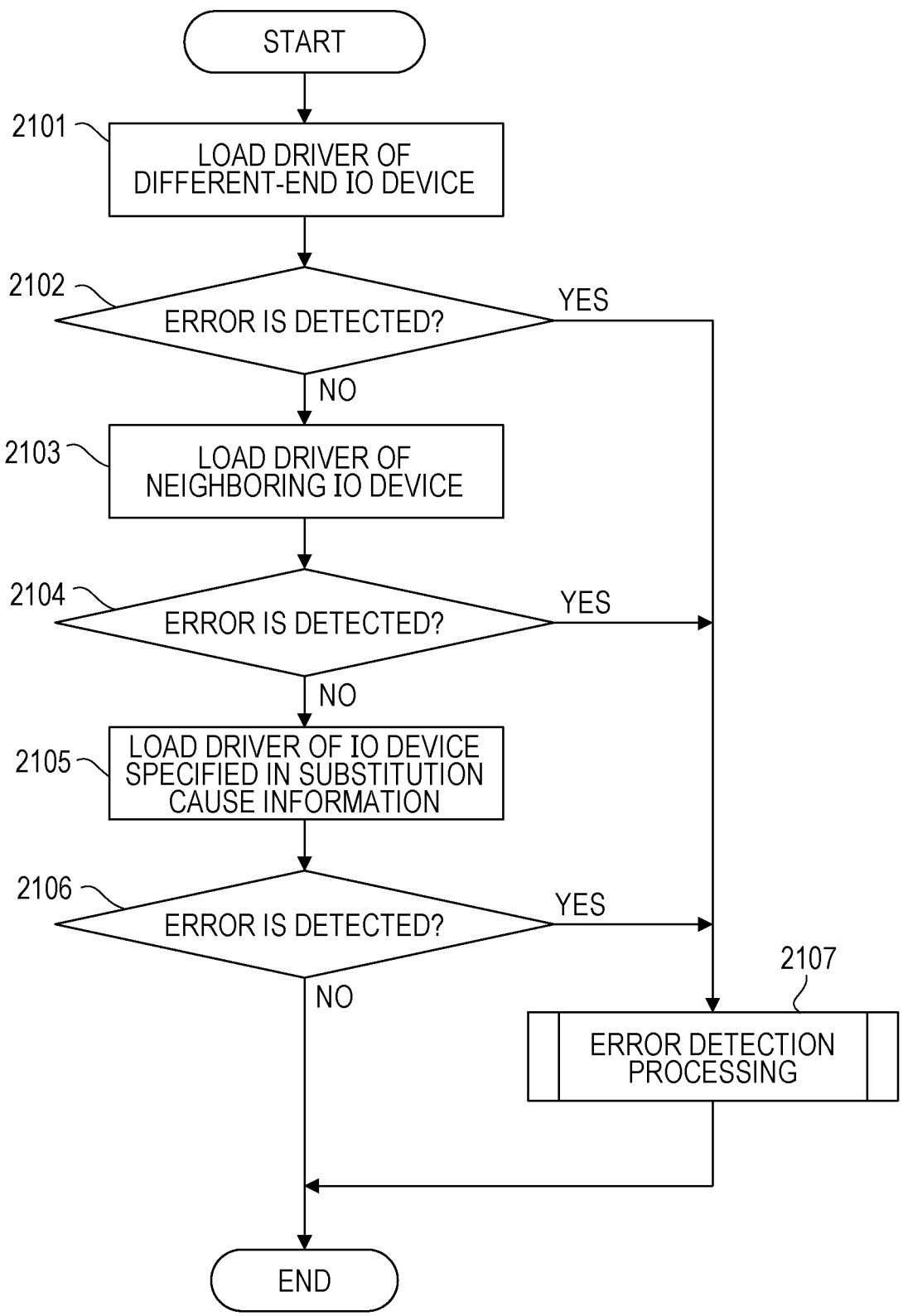
FIG. 21 is a flowchart of diagnosis processing.

FIG. 21 is a flowchart illustrating the diagnosis processing at step 1907 in FIG. 19. First, the CPU 611 loads the driver of the different-end IO device, accesses the IO device by using the loaded driver, and initializes the IO device (step 2101). Then, the CPU 611 checks whether an error is detected in the access to the different-end IO device (step 2102).

If an error is detected (step 2102, YES), the CPU 611 executes error detection processing (step 2107). In this case, the CPU 611 writes the error information of the error-detected IO device to an error register in the CPU 611.

On the other hand, if no error is detected (step 2102, NO), the CPU 611 loads the driver of the neighboring IO device, accesses the IO device by using the loaded driver, and initializes the IO device (step 2103). Then, the CPU 611 checks whether an error is detected in the access to the neighboring IO device (step 2104). If an error is detected (step 2104, YES), the CPU 611 executes the error detection processing (step 2107).

On the other hand, if no error is detected (step 2104, NO), the CPU 611 loads the driver of the IO device specified in the substitution cause information 643 (step 2105). Then, the CPU 611 accesses the IO device by using the loaded driver and initializes the IO device. Subsequently, the CPU 611 checks whether an error is detected in the access to the IO device specified in the substitution cause information 643 (step 2106). If an error is detected (step 2106, YES), the CPU 611 executes the error detection processing (step 2107).

On the other hand, if no error is detected (step 2106, NO), the CPU 611 terminates the processing.

Figure 22:
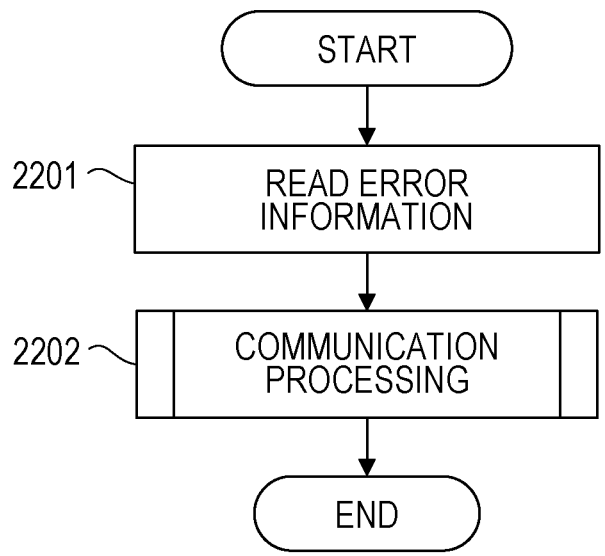
FIG. 22 is a flowchart of error detection processing.

FIG. 22 is a flowchart illustrating an example of the error detection processing at step 2103 in FIG. 21. The CPU 611 reads the error information from the error register (step 2201), and performs the communication processing in FIG. 20 to send an error report containing the read error information to the management apparatus 602 (step 2202). In this case, the CPU 611 sends a command containing the error report, and receives an acknowledgment indicating the reception of the error report.

The execution of the diagnosis processing in FIG. 21 under the substitute configuration assures that each of the IO devices is accessed during the operation of the BIOS 621. If an error is detected in the diagnosis processing, the error report is sent to the management apparatus 602 irrespective of whichever the error-detected IO device is among the IO device specified in the substitution cause information 643, the different-end IO device, and the neighboring IO device.

Thus, the management apparatus 602 executes the error control processing in FIG. 11 to identify the suspect component.

On the other hand, if no error is detected in the diagnosis processing, this state means that all of the IO device specified in the substitution cause information 643, the different-end IO device, and the neighboring IO device are accessible. This suggests that the error indicated by the substitution cause information 643 is not caused by a stationary failure, but is caused by an intermittent failure.

In this case, since the suspect component is not identified, the information processing apparatus 601 is continuously operated in the substitute configuration and the occurrence of an error is monitored during the operation. If an error is detected by the OS 622 during the operation, the management apparatus 602 identifies the suspect component by executing the error control processing in FIG. 11 based on the error report from the OS 622.

The diagnosis processing in FIG. 21 may be used to detect an initial error when the information processing apparatus 601 is adjusted in a real work site.

Here, at step 2101 in FIG. 21, the CPU 611 may initialize two or more different-end IO devices instead of initializing one different-end IO device. In addition, at step 2103 in FIG. 21, the CPU 611 may initialize two or more neighboring IO devices instead of initializing one neighboring IO device.

Figure 23:
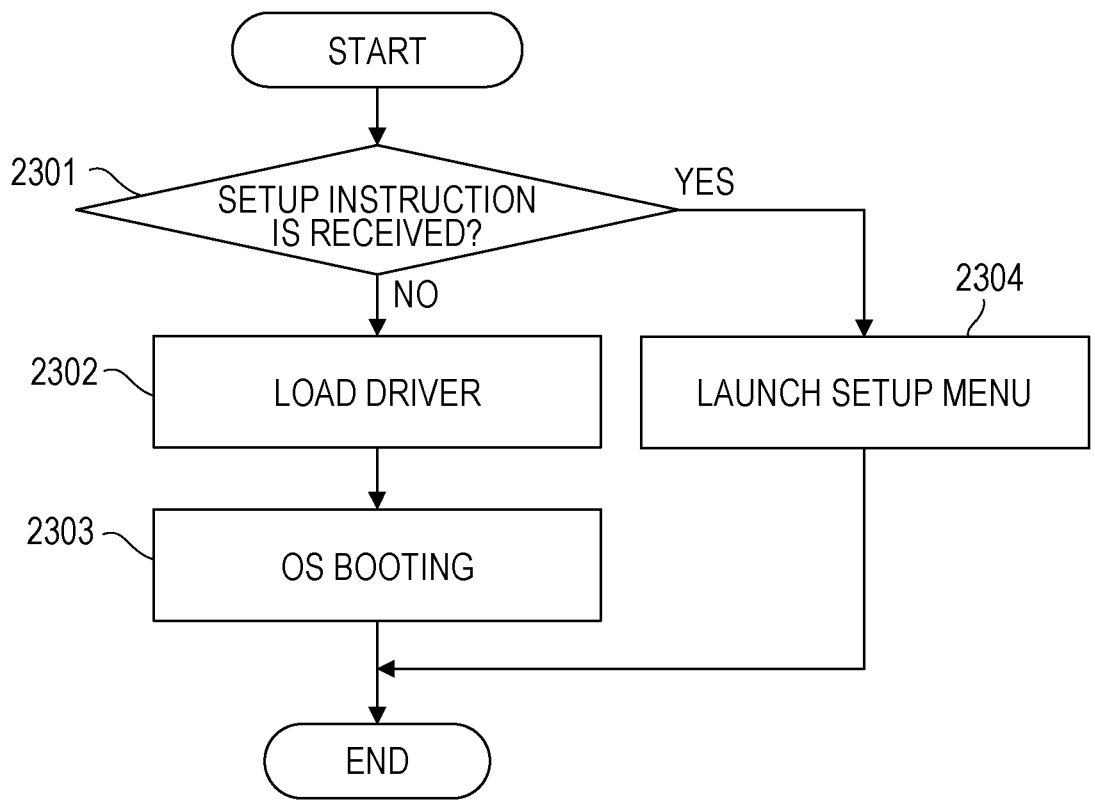
FIG. 23 is a flowchart of boot control processing.

FIG. 23 is a flowchart illustrating an example of the boot control processing at step 1703 in FIG. 17. First, the CPU 611 checks whether or not a setup instruction for the BIOS 621 is issued by a user (step 2301).

If the setup instruction is not issued (step 2301, NO), the CPU 611 loads the driver of the IO device (boot device) to be used as a resource to start up the OS (step 2302). Then, the CPU 611 starts up the OS 622 by OS booting (step 2303).

On the other hand, if the setup instruction is issued (step 2301, YES), the CPU 611 launches a setup menu (step 2304).

According to the information processing system in FIG. 6, the accuracy in narrowing down suspect components may be improved just by adding signal lines for redundant paths between a higher-level BUS-SW and a lower-level BUS-SW. Then, when a suspect component is identified, the component is disconnected. Thus, a reoccurrence of the error due to the same component is avoided.

The operation in the substitute configuration is not special. For this reason, if no error is detected in the diagnosis processing, the information processing system may continuously run without having to return the substitute configuration to the normal configuration.

If a higher-level BUS-SW is eventually identified as a suspect component, the BUS-SW is disconnected to establish the degenerate configuration. In this way, the information processing system may continuously run without waiting until the suspect component is replaced with a new one. Thus, system down due to a failure of a component on a path is avoided.

After a faulty component is identified and is repaired or replaced, the management apparatus 602 performs control to return the path configuration to the normal configuration. In this case, in the management apparatus 602, the entry number en in the condition information 641 is changed to the entry number indicating the normal configuration, and the substitution cause information 643 is deleted.

Figure 24A:
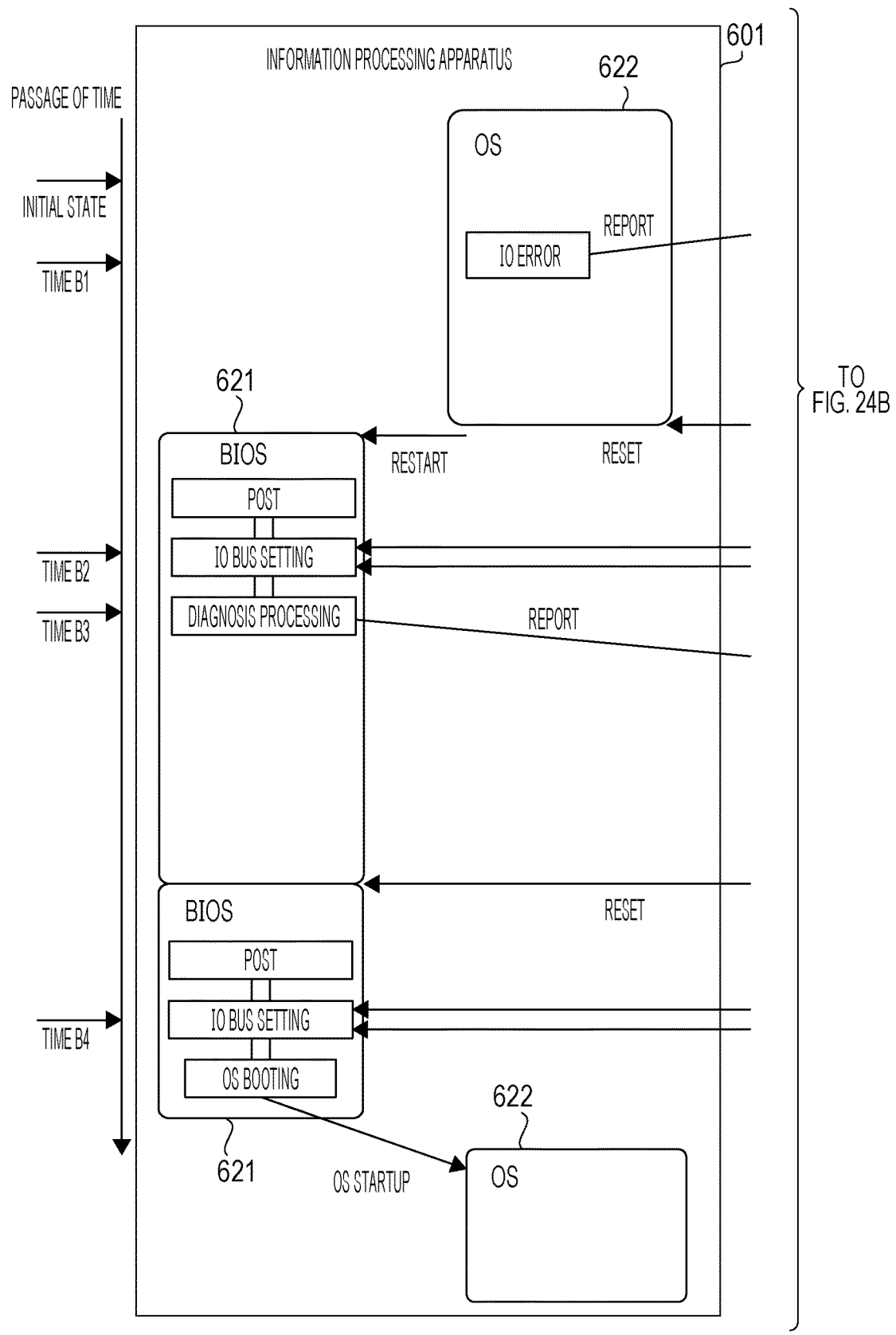
FIGS. 24A and 24B are diagrams illustrating a first operation sequence for changing a path configuration.
Figure 24B:
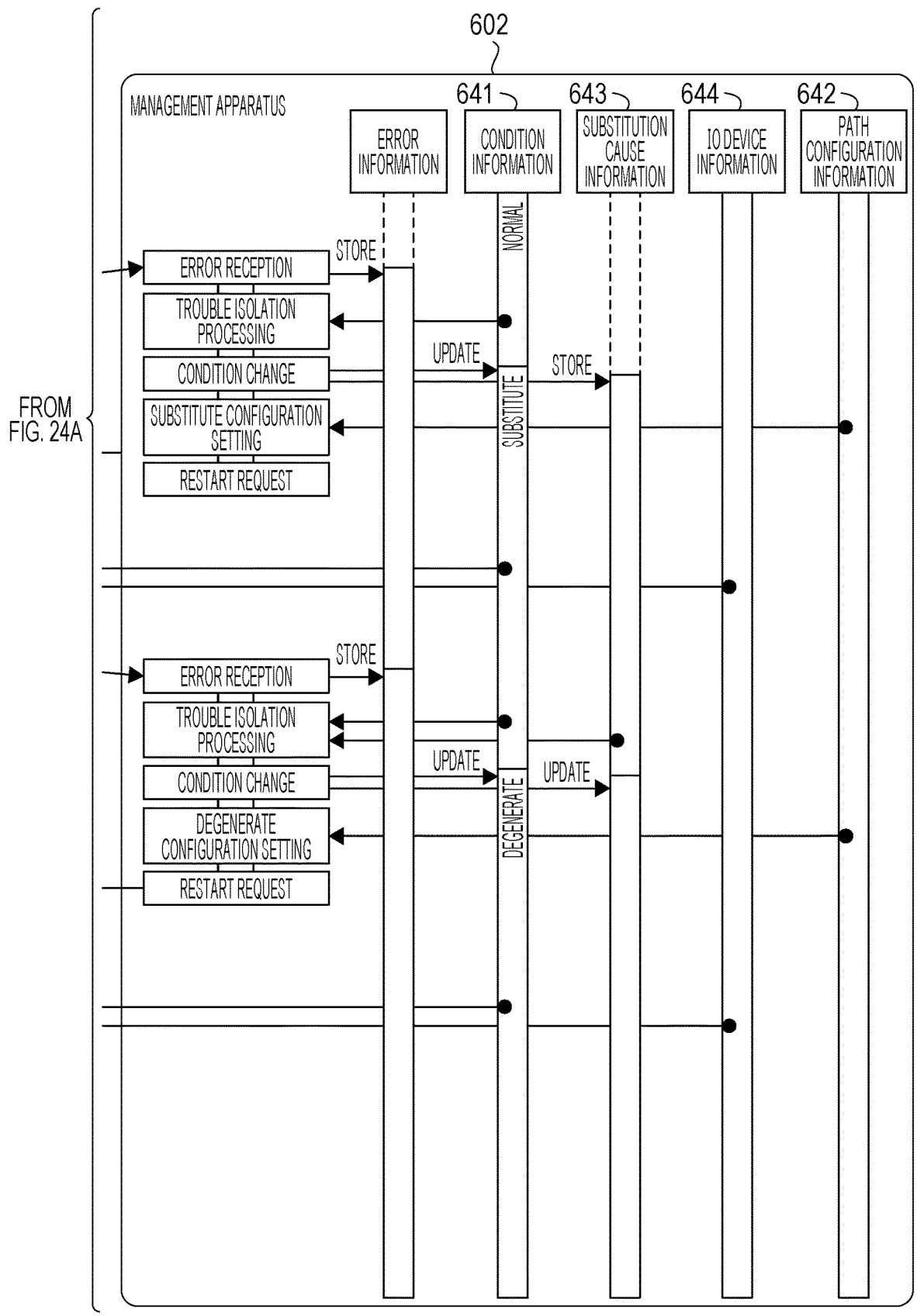

FIGS. 24A and 24B illustrate an example of a first operation sequence for changing the path configuration in the information processing apparatus 601 in FIG. 6. In an initial state, the path configuration in the information processing apparatus 601 is set to the normal configuration in FIG. 8.

First, at time B1, the OS 622 detects an IO error of the IO device 625-1, and reports the first IO error to the management apparatus 602. The management apparatus 602 receives the error report and stores the error information. In this case, since the error information does not indicate a device error, the management apparatus 602 performs the path error processing in FIG. 14.

In the path error processing, the management apparatus 602 reads the condition information 641, and executes trouble isolation processing. Since the condition information 641 indicates the normal configuration, the management apparatus 602 updates the path configuration indicated by the condition information 641 to the substitute configuration, and stores the substitution cause information 643 specifying the IO device 625-1. The suspect components at this time point are the BUS-SW 623-1, the BUS-SW 624-1, and the IO device 625-1 included in the path from the CPU 611 to the IO device 625-1.

Next, the management apparatus 602 executes the configuration change processing in FIG. 16 to read the entry specifying the substitute configuration from the path configuration information 642 and set up the paths for the substitute configuration. Then, the management apparatus 202 sends a restart request to the OS 622 to reset the OS 622. In response to the restart request, the OS 622 restarts the information processing apparatus 601, and the BIOS 621 executes the POST in FIG. 17.

At time B2, the BIOS 621 executes the IO initialization processing in FIG. 19 to read the condition information 641 and the IO device information 644 from the management apparatus 602. Since the condition information 641 indicates the substitute configuration, the BIOS 621 sets the address strings of the IO devices in the registers to set up the IO buses. At time B3, the BIOS 621 executes the diagnosis processing in FIG. 21 to detect an IO error of the IO device 625-5 and report a second IO error to the management apparatus 602.

The management apparatus 602 receives the error report, stores the error information, and executes the path error processing. In the path error processing, the management apparatus 602 reads the condition information 641 and the substitution cause information 643, and executes the trouble isolation processing. Since the condition information 641 indicates the substitute configuration and the error information and the substitution cause information 643 do not match each other, the management apparatus 602 executes the switch search processing in FIG. 15.

Since the BUS-SW 624-2 to which the IO device 625-5 is coupled is different from the BUS-SW 624-1 to which the IO device 625-1 is coupled, the IO device 625-5 is determined as a different-end IO device. Hence, the management apparatus 602 identifies, as a suspect component, the higher-level BUS-SW 623-1 included in common in both of the path from the CPU 611 to the IO device 625-1 and the path from the CPU 611 to the IO device 625-5. Then, the management apparatus 602 updates the path configuration indicated by the condition information 641 to the degenerate configuration, and updates the substitution cause information 643 to information specifying the IO device 625-5.

Subsequently, the management apparatus 602 executes the configuration change processing to read the entry specifying the degenerate configuration from the path configuration information 642, and set up the paths for the degenerate configuration. Then, the management apparatus 202 sends a restart request to the OS 622 to reset the OS 622. In response to the restart request, the OS 622 restarts the information processing apparatus 601, and the BIOS 621 executes the POST.

At time B4, the BIOS 621 executes the IO initialization processing to read the condition information 641 and the IO device information 644 from the management apparatus 602. Since the condition information 641 indicates the degenerate configuration, the BIOS 621 sets the address strings of the IO devices in the registers to set up the IO buses. Then, the BIOS 621 starts up the OS 622 by OS booting.

Figure 25A:
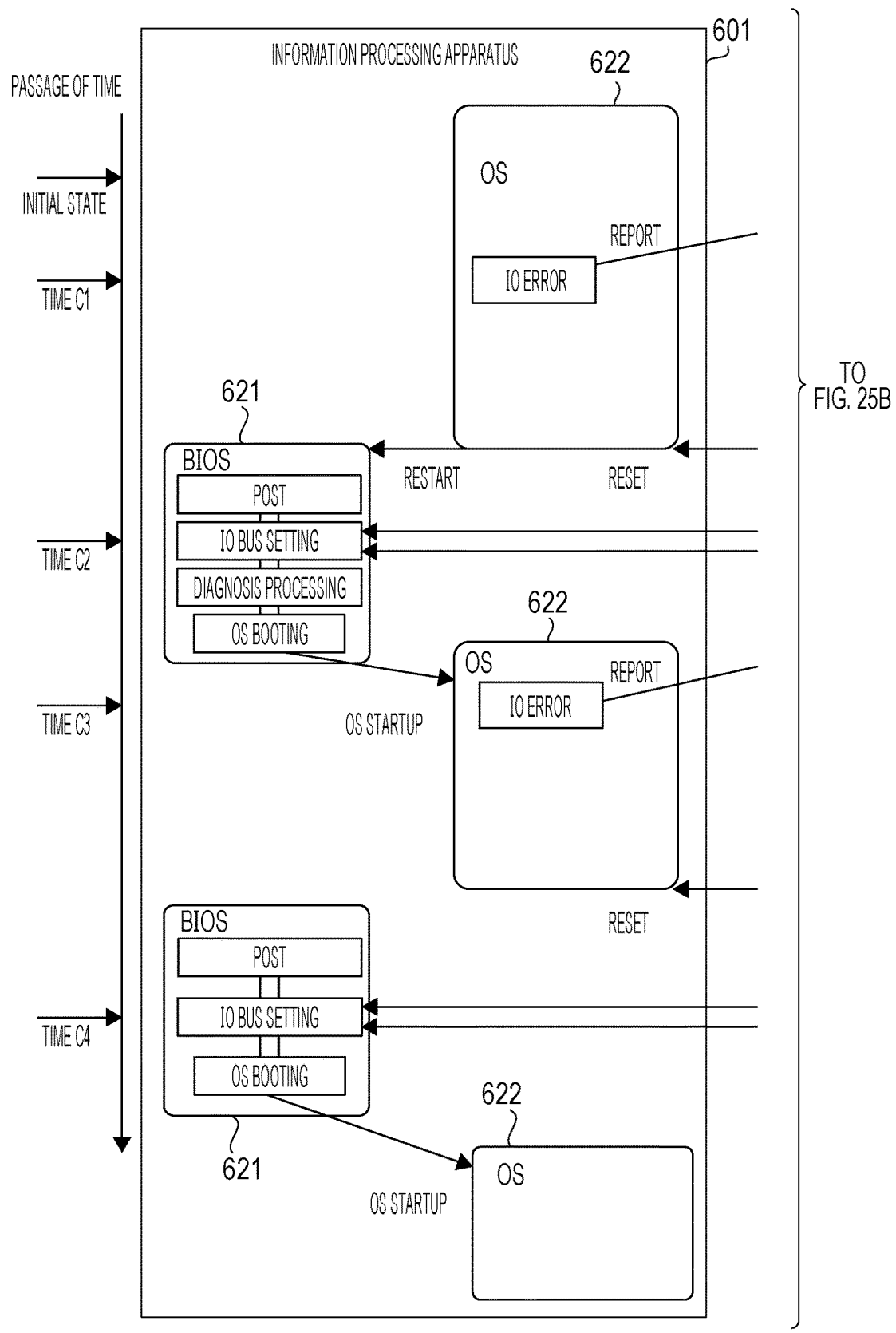
FIGS. 25A and 25B are diagrams illustrating a second operation sequence for changing a path configuration.
Figure 25B:
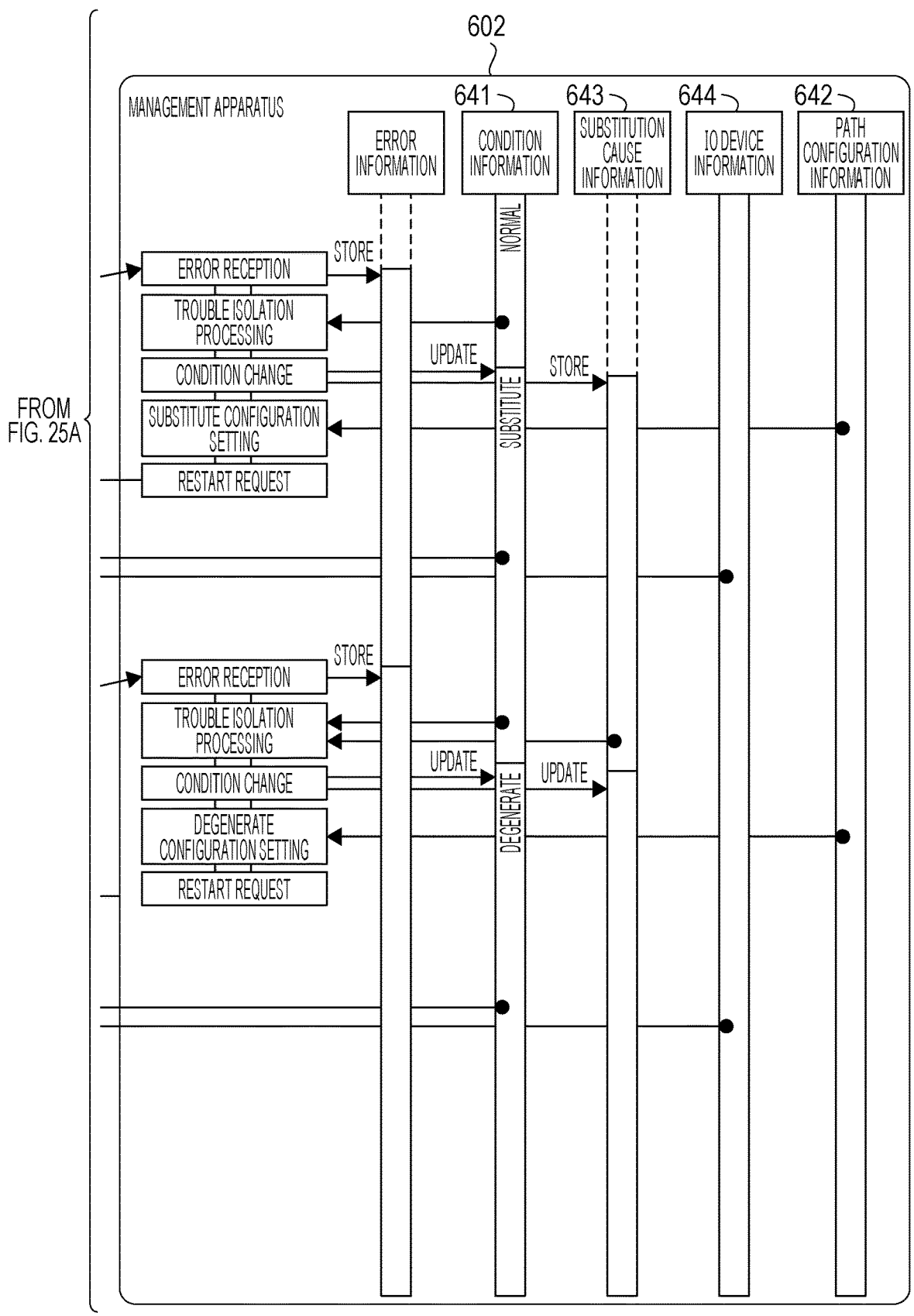

FIGS. 25A and 25B illustrate an example of a second operation sequence for changing the path configuration in the information processing apparatus 601 in FIG. 6. In the second operation sequence, an error due to an intermittent failure of the BUS-SW 623-1 occurs, the error does not reoccur during execution of the POST in the substitute configuration, and thereafter the OS 622 detects a reoccurrence of the error. Operations at time C1 and time C2 are the same as the operations at time B1 and time B2 in FIG. 24A.

The BIOS 621 executes the diagnosis processing after setting up the IO buses. In this case, however, the BIOS 621 does not detect an IO error and therefore restarts the OS 622 by OS booting.

At time C3, the OS 622 detects an IO error of the IO device 625-5 and reports the second IO error to the management apparatus 602.

The management apparatus 602 executes the same operations as in FIGS. 24A and 24B to identify the higher-level BUS-SW 623-1 as the suspect component and executes the configuration change processing to set up the paths for the degenerate configuration. Then, the management apparatus 202 sends a restart request to the OS 622 to reset the OS 622. In response to the restart request, the OS 622 restarts the information processing apparatus 601, and the BIOS 621 executes the POST.

At time C4, the BIOS 621 sets up the IO buses and restarts the OS 622 by OS booting.

As described above, even in the case where an IO error intermittently occurs, a suspect component may be identified by continuously monitoring the error in the substitute configuration.

Figure 1:
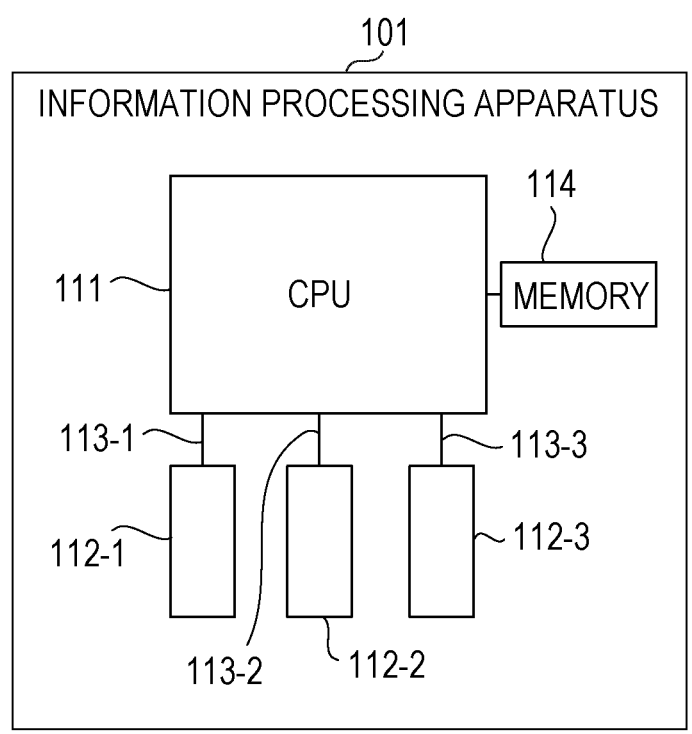
FIG. 1 is a configuration diagram of a small-scale information processing apparatus.

The information processing apparatus 101 in FIG. 1 is just one example, and part of the constituent elements may be omitted or altered depending on the use purpose or conditions of the information processing apparatus 101.

The information processing apparatus 201 in FIG. 2 is just one example, and part of the constituent elements may be omitted or altered depending on the use purpose or conditions of the information processing apparatus 201. For example, the number of higher-level BUS-SWs is not limited to 4 but may be K (K is an integer of 2 or more). Similarly, the number of lower-level BUS-SWs is not limited to 4, but may be K. The number of IO devices coupled to each of the lower-level BUS-SWs is not limited to 3, but may be L (L is an integer of 1 or more).

The management apparatus 401 in FIG. 4 is just one example, and part of the constituent elements may be omitted or altered depending on the use purpose or conditions of the management apparatus 401.

The information processing system in FIG. 6 is just one example, and part of the constituent elements may be omitted or altered depending on the use purpose or conditions of the information processing system. For example, the number of higher-level modules included in the information processing apparatus 601 is not limited to 2 but may be K.

Similarly, the number of lower-level modules is not limited to 2 but may be K. The number of IO devices coupled to each of the lower-level BUS-SWs is not limited to 3, but may be L.

The levels of the modules including BUS-SWs are not limited to 2 levels, but may be M levels (M is an integer of 2 or more). In this case, redundant paths are provided between BUS-SWs in a p-th level (p=1 to M−1) and BUS-SWs in a (p+1)-th level. This configuration enables suspect components to be narrowed down on a level-by-level basis.

The flowcharts in FIG. 5 and FIGS. 11 to 23 are just examples, and part of the processing may be omitted or altered depending on the configuration or conditions of the information processing system. For example, if the information processing system is configured not to run in the degenerate configuration, the processes at step 1415 in FIG. 14, at steps 1602, 1607, and 1608 in FIG. 16, and at steps 1903 and 1904 in FIG. 19 may be omitted.

The condition information 641, the path configuration information 642, the substitution cause information 643, and the IO device information 644 illustrated in FIGS. 7A to 7D are just one example, and these kinds of information may be altered depending on the configuration or conditions of the information processing apparatus 601. For example, if the information processing system 601 is configured not to run in the degenerate configuration, the entries of the entry numbers "5" and "6" in FIG. 7B may be omitted.

The path configurations illustrated in FIGS. 8 to 10 are just examples, and the path configurations may be altered depending on the configuration or conditions of the information processing apparatus 601. The operation sequences illustrated in FIGS. 3A, 3B, 24A, 24B, 25A, and 25B are just examples, and the operation sequences may be altered depending on the configuration of the information processing system 601 and the faulty component.

Figure 26:
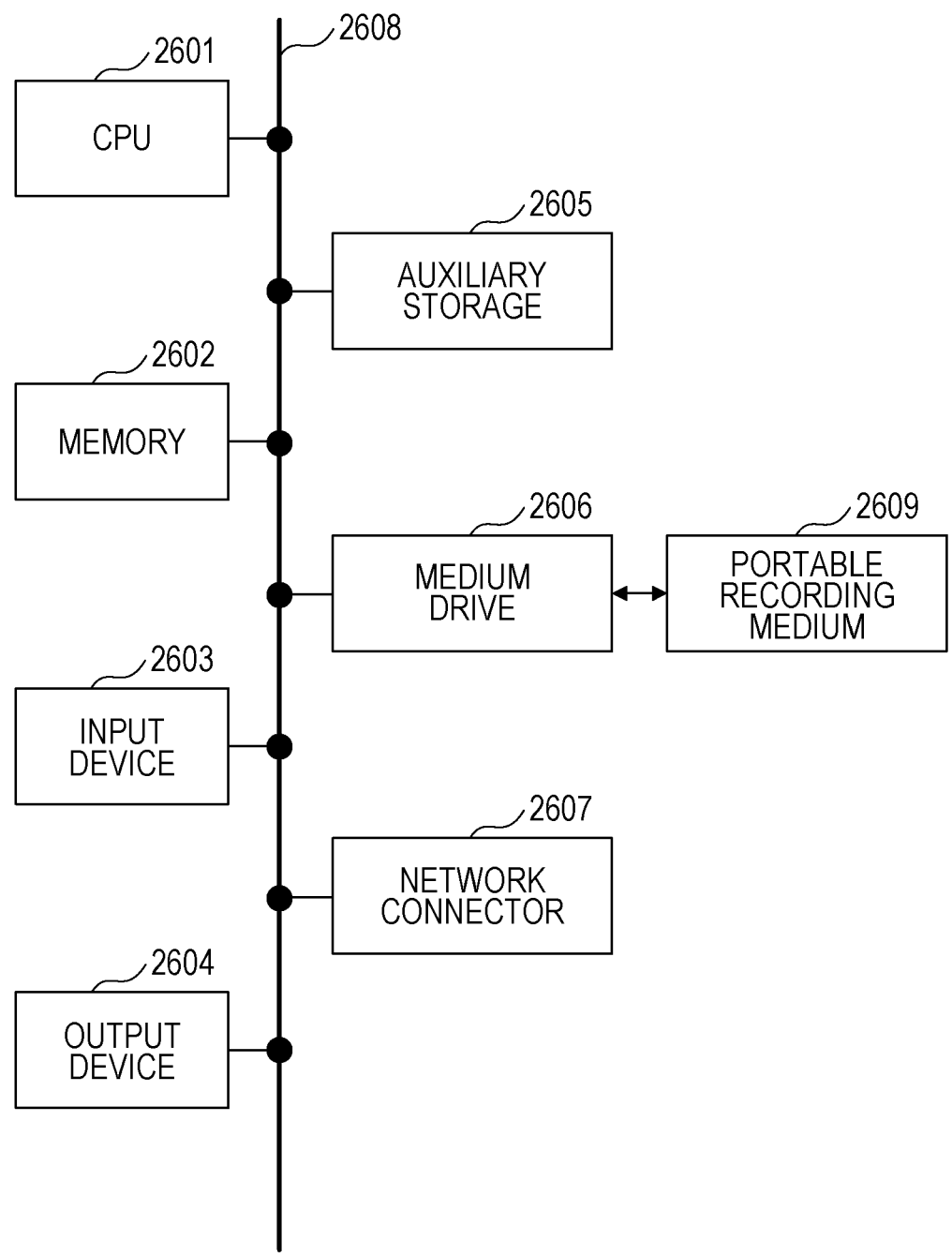
FIG. 26 is a hardware configuration diagram of an information processing apparatus.

FIG. 26 illustrates a hardware configuration example of an information processing apparatus for use as the management apparatus 202 in FIG. 2, the management apparatus 401 in FIG. 4, and the management apparatus 602 in FIG. 6. The information processing apparatus in FIG. 26 includes a CPU 2601, a memory 2602, an input device 2603, an output device 2604, an auxiliary storage 2605, a medium drive 2606, and a network connector 2607. These constituent elements are coupled to each other via a bus 2608.

The memory 2602 is, for example, a semiconductor memory such as a read only memory (ROM), a random access memory (RAM), or a flash memory, and stores programs and data to be used for processing. The memory 2602 may be used as the storage unit 411 in FIG. 4 or the storage unit 631 in FIG. 6.

The CPU 2601 (processor) operates as the control unit 412 and the identification unit 413 in FIG. 4 by executing a program using the memory 2602, for example. The CPU 2601 also operates as the control unit 632, the identification unit 633, and the monitoring unit 634 in FIG. 6 by executing a program using the memory 2602, for example.

The input device 2603 is, for example, a keyboard, a pointing device, or the like, and is used to input instructions or information by an operator or a user. The output device 2604 is, for example, a display device, a printer, a speaker, or the like, and is used to output inquiries or instructions to the operator or the user, and processing results. The processing result may be an SEL.

The auxiliary storage 2605 is, for example, a magnetic disk drive, an optical disk drive, a magneto-optical disk drive, a tape drive, or the like. The auxiliary storage 2605 may be a hard disk drive. The information processing apparatus stores the programs and data in the auxiliary storage 2605, and is able to use them by loading them into the memory 2602. The auxiliary storage 2605 may be used as the storage unit 411 in FIG. 4 or the storage unit 631 in FIG. 6.

The medium drive 2606 drives a portable recording medium 2609 and accesses data recorded in the portable recording medium 2609. The portable recording medium 2609 is a memory device, a flexible disk, an optical disk, a magneto-optical disk, or the like. The portable recording medium 2609 may be a compact disk read only memory (CD-ROM), a digital versatile disk (DVD), a Universal Serial Bus (USB) memory, or the like. The operator or the user stores the programs and data in the portable recording medium 2609, and is able to use them by loading them into the memory 2602.

As described above, a computer-readable recording medium in which programs and data to be used for processing are stored is a physical (non-transitory) recording medium like the memory 2602, the auxiliary storage 2605, or the portable recording medium 2609.

The network connector 2607 is a communication interface circuit which is coupled to a communication network such as a local area network (LAN) or a wide area network (WAN), and which performs data conversion associated with communications. The information processing apparatus communicates with the information processing apparatus 601 via the network connector 2607. The information processing apparatus may also receive programs and data from an external apparatus via the network connector 2607, and use them by loading them into the memory 2602.

Note that the information processing apparatus does not have to include all the constituent elements in FIG. 26, and part of the constituent elements may be omitted depending on the use purpose or conditions. For example, if an interface with the user or the operator is not used, the input device 2603 and the output device 2604 may be omitted. In another case, the medium drive 2606 may be omitted if the portable recording medium 2609 is not used.

The same information processing apparatus as in FIG. 26 is used as the information processing apparatus 201 in FIG. 2 and the information processing apparatus 601 in FIG. 6. The disclosed embodiments and their advantages are described in detail. Those skilled in the art may make various changes, additions, and omissions without departing from the scope of the present disclosure clearly described in CLAIMS.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management apparatus comprising:
   a memory configured to store path configuration information specifying a first path configuration and a second path configuration each of which indicates a target path configuration from a target processor to a plurality of input and output devices; and a processor coupled to the memory and configured to:
when an error is detected from among the plurality of input and output devices while the target path configuration is the first path configuration, change the first path configuration to the second path configuration, and
when an error is detected from among the plurality of input and output devices while the target path configuration is the second path configuration and after the change of the first path configuration to the second path configuration, identify a suspect component included in the target path configuration based on a comparison between a first input and output device whose error has been detected while the target path configuration is the first path configuration and a second input and output device whose error has been detected while the target path configuration is the second path configuration.

2. The management apparatus of claim 1, wherein:
the target path configuration includes a plurality of higher-level switches and a plurality of lower-level switches;
each of the plurality of higher-level switches is coupled to one of the plurality of lower-level switches;
each of the plurality of lower-level switches is coupled to at least one of the plurality of input and output devices;
the processor changes the first path configuration to the second path configuration by changing a topology of links between the plurality of higher-level switches and the plurality of lower-level switches under the first path configuration; and
when the first input and output device is an input and output device coupled to a first lower-level switch out of the plurality of lower-level switches, and the second input and output device is an input and output device coupled to a second lower-level switch out of the plurality of lower-level switches, the processor identifies, as the suspect component, a first higher-level switch out of the plurality of higher-level switches that is coupled to the first lower-level switch under the first path configuration.

3. The management apparatus of claim 2, wherein
the processor changes the second path configuration to a third path configuration in which the first higher-level switch identified as the suspect component is not used, by changing a topology of links between the plurality of higher-level switches and the plurality of lower-level switches under the second path configuration.

4. The management apparatus of claim 1, wherein:
the target path configuration includes a plurality of higher-level switches and a plurality of lower-level switches;
each of the plurality of higher-level switches is coupled to one of the plurality of lower-level switches;
each of the plurality of lower-level switches is coupled to at least one of the plurality of input and output devices;
the processor changes the first path configuration to the second path configuration by changing a topology of links between the plurality of higher-level switches and the plurality of lower-level switches under the first path configuration; and
when the first input and output device is an input and output device coupled to a first lower-level switch out of the plurality of lower-level switches, and the second input and output device is an input and output device coupled to the first lower-level switch, the processor identifies the first lower-level switch as the suspect component.

5. The management apparatus of claim 1, wherein:
the target path configuration includes a plurality of higher-level switches and a plurality of lower-level switches;
each of the plurality of higher-level switches is coupled to one of the plurality of lower-level switches;
each of the plurality of lower-level switches is coupled to at least one of the plurality of input and output devices;
the processor changes the first path configuration to the second path configuration by changing a topology of links between the plurality of higher-level switches and the plurality of lower-level switches under the first path configuration; and
when the first input and output device is identical with the second input and output device, the processor identifies the first input and output device as the suspect component.

6. An information processing apparatus comprising:
a processor;
a plurality of input and output devices; and
a plurality of switches that change paths between the processor and the plurality of input and output devices, wherein
when the processor detects an error from among the plurality of input and output devices while a path configuration from the processor to the plurality of input and output devices is a first path configuration, the plurality of switches changes the first path configuration to a second path configuration; and
when the processor detects an error from among the plurality of input and output devices while the target path configuration is the second path configuration and after the change from the first path configuration to the second path configuration, the plurality of switches changes the second path configuration to a third path configuration based on a comparison between a first input and output device whose error has been detected while the target path configuration is the first path configuration and a second input and output device whose error has been detected while the target path configuration is the second path configuration.

7. The information processing apparatus of claim 6, wherein:
the plurality of switches include a plurality of higher-level switches and a plurality of lower-level switches;
each of the plurality of higher-level switches is coupled to one of the plurality of lower-level switches;
each of the plurality of lower-level switches is coupled to at least one of the plurality of input and output devices;
the plurality of higher-level switches change the first path configuration to the second path configuration by changing a topology of links between the plurality of higher-level switches and the plurality of lower-level switches under the first path configuration;
the comparison indicates that the first input and output device is an input and output device coupled to a first lower-level switch out of the plurality of lower-level switches, and that the second input and output device is an input and output device coupled to a second lower-level switch out of the plurality of lower-level switches;
the plurality of higher-level switches change the second path configuration to the third path configuration by changing a topology of links between the plurality of higher-level switches and the plurality of lower-level switches under the second path configuration; and
the third path configuration is a path configuration in which a higher-level switch out of the plurality of higher-level switches that is coupled to the first lower-level switch under the first path configuration is not used.

8. A non-transitory, computer-readable recording medium having stored therein a program for causing a processor to execute a process comprising:

when an error is detected from among a plurality of input and output devices while a target path configuration from a target processor to the plurality of input and output devices is a first path configuration, changing the first path configuration to a second path configuration; and when an error is detected from among the plurality of input and output devices while the target path configuration is the second path configuration and after the changing from the first path configuration to the second path configuration, identifying a suspect component included in the target path configuration based on a comparison between a first input and output device whose error has been detected while the target path configuration is the first path configuration and a second input and output device whose error has been detected while the target path configuration is the second path configuration.

9. The non-transitory, computer-readable recording medium of claim 8, wherein:

the target path configuration includes a plurality of higher-level switches and a plurality of lower-level switches;

each of the plurality of higher-level switches is coupled to one of the plurality of lower-level switches;

each of the plurality of lower-level switches is coupled to at least one of the plurality of input and output devices; and the process further comprises:

changing the first path configuration to the second path configuration by changing a topology of links between the plurality of higher-level switches and the plurality of lower-level switches under the first path configuration, and when the first input and output device is an input and output device coupled to a first lower-level switch out of the plurality of lower-level switches, and the second input and output device is an input and output device coupled to a second lower-level switch out of the plurality of lower-level switches, identifying, as the suspect component, a first higher-level switch out of the plurality of higher-level switches that is coupled to the first lower-level switch under the first path configuration.

10. The non-transitory, computer-readable recording medium of claim 9, the process further comprising changing the second path configuration to a third path configuration in which the first higher-level switch identified as the suspect component is not used, by changing a topology of links between the plurality of higher-level switches and the plurality of lower-level switches under the second path configuration.

11. The non-transitory, computer-readable recording medium of claim 8, wherein:

the target path configuration includes a plurality of higher-level switches and a plurality of lower-level switches;

each of the plurality of higher-level switches is coupled to one of the plurality of lower-level switches;

each of the plurality of lower-level switches is coupled to at least one of the plurality of input and output devices; and the process further comprises:

changing the first path configuration to the second path configuration by changing a topology of links between the plurality of higher-level switches and the plurality of lower-level switches under the first path configuration, and when the first input and output device is an input and output device coupled to a first lower-level switch out of the plurality of lower-level switches, and the second input and output device is an input and output device coupled to the first lower-level switch, identifying the first lower-level switch as the suspect component.

12. The non-transitory, computer-readable recording medium of claim 8, wherein:

the target path configuration includes a plurality of higher-level switches and a plurality of lower-level switches;

each of the plurality of higher-level switches is coupled to one of the plurality of lower-level switches;

each of the plurality of lower-level switches is coupled to at least one of the plurality of input and output devices; and the process further comprises:

changing the first path configuration to the second path configuration by changing a topology of links between the plurality of higher-level switches and the plurality of lower-level switches under the first path configuration, and when the first input and output device is identical with the second input and output device, identifying the first input and output device as the suspect component.

\* \* \* \* \*